United States Patent
Ikari

(10) Patent No.: US 9,699,354 B2
(45) Date of Patent: Jul. 4, 2017

(54) IMAGE PROCESSING APPARATUS METHOD AND MEDIUM CORRECTING VALUE OF PIXEL OF INTEREST IN IMAGE DATA USING DETERMINED AMOUNT OF CORRECTION

(71) Applicant: CANON KABUSHIKI KAISHA, Tokyo (JP)

(72) Inventor: Daiki Ikari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/624,964

(22) Filed: Feb. 18, 2015

(65) Prior Publication Data
US 2015/0256715 A1 Sep. 10, 2015

(30) Foreign Application Priority Data

Mar. 10, 2014 (JP) ................. 2014-046761

(51) Int. Cl.
| | | |
|---|---|---|
| H04N 1/409 | (2006.01) | |
| H04N 1/40 | (2006.01) | |
| H04N 1/407 | (2006.01) | |
| G06T 7/40 | (2006.01) | |
| G06T 5/40 | (2006.01) | |
| G06T 5/00 | (2006.01) | |

(52) U.S. Cl.
CPC .......... *H04N 1/4095* (2013.01); *G06T 5/007* (2013.01); *G06T 5/40* (2013.01); *H04N 1/4072* (2013.01); *H04N 1/40093* (2013.01)

(58) Field of Classification Search
None
See application file for complete search history.

(56) References Cited

U.S. PATENT DOCUMENTS

| | | | |
|---|---|---|---|
| 6,285,470 B1 * | 9/2001 | Matsuda | H04N 1/4095 358/474 |
| 6,664,973 B1 | 12/2003 | Iwamoto et al. | |
| 7,099,041 B1 | 8/2006 | Moriya et al. | |
| 8,031,381 B2 * | 10/2011 | Yotsuyanagi | H04N 1/00681 347/104 |
| 8,189,914 B2 * | 5/2012 | Hong | H04N 1/4074 382/162 |

(Continued)

FOREIGN PATENT DOCUMENTS

| | | |
|---|---|---|
| JP | 2000-253250 A | 9/2000 |
| JP | 2001-014456 A | 1/2001 |

(Continued)

*Primary Examiner* — Thomas D Lee
(74) *Attorney, Agent, or Firm* — Fitzpatrick, Cella, Harper & Scinto

(57) ABSTRACT

For preferably reducing show-through in an image obtained by reading an original, an image processing apparatus: stores an index value for each of a plurality of mutually differing degrees of variation; obtains a degree of variation of signal values included in a region of interest of a predetermined size including a pixel of interest included in image data corresponding to the read image; obtains a value indicating a brightness of the region of interest; determines an amount of correction of a value of the pixel of interest using the obtained value and an index value corresponding to the obtained degree of variation; and corrects the value of the pixel of interest using the determined amount of correction.

23 Claims, 16 Drawing Sheets

(56) References Cited

U.S. PATENT DOCUMENTS

| | | | |
|---|---|---|---|
| 8,243,333 B2* | 8/2012 | Tamura | H04N 1/4095 358/2.1 |
| 8,416,470 B2* | 4/2013 | Jeong | H04N 1/00002 358/3.26 |
| 8,503,733 B2* | 8/2013 | Roof | H04N 1/4095 382/112 |
| 2001/0050778 A1 | 12/2001 | Fukuda et al. | |
| 2008/0123153 A1* | 5/2008 | Yamada | G06K 15/02 358/3.27 |
| 2011/0317936 A1* | 12/2011 | Takamura | G06T 5/008 382/274 |
| 2013/0301067 A1* | 11/2013 | Nakamura | H04N 1/00037 358/1.13 |

FOREIGN PATENT DOCUMENTS

| | | |
|---|---|---|
| JP | 2004-336282 A | 11/2004 |
| JP | 2006-197445 A | 7/2006 |
| JP | 2012160883 A | 8/2012 |

* cited by examiner

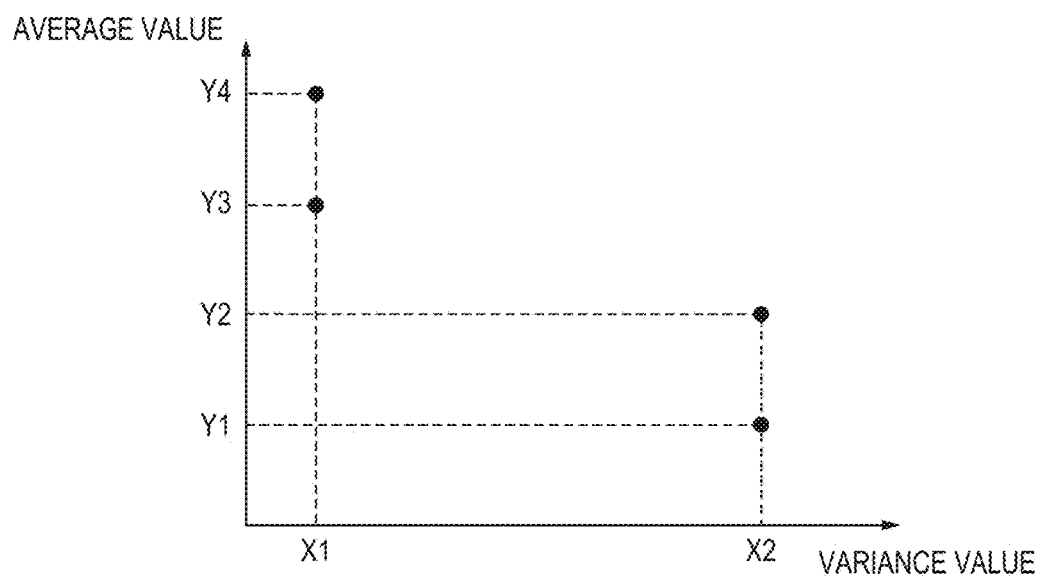

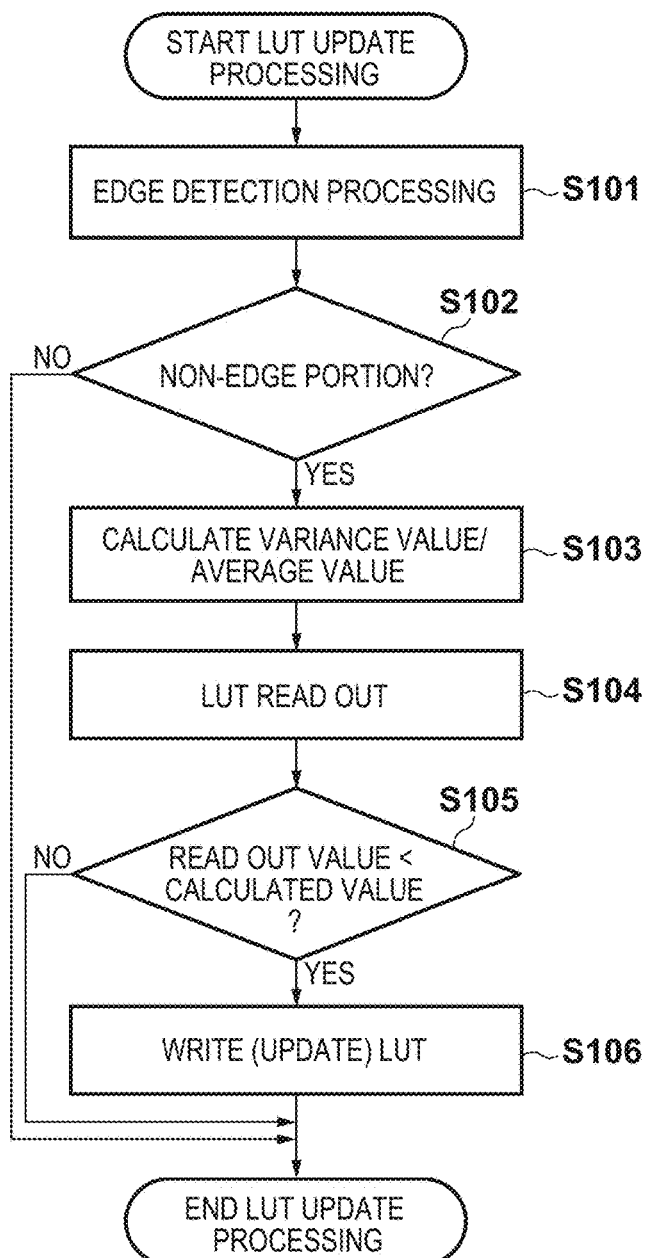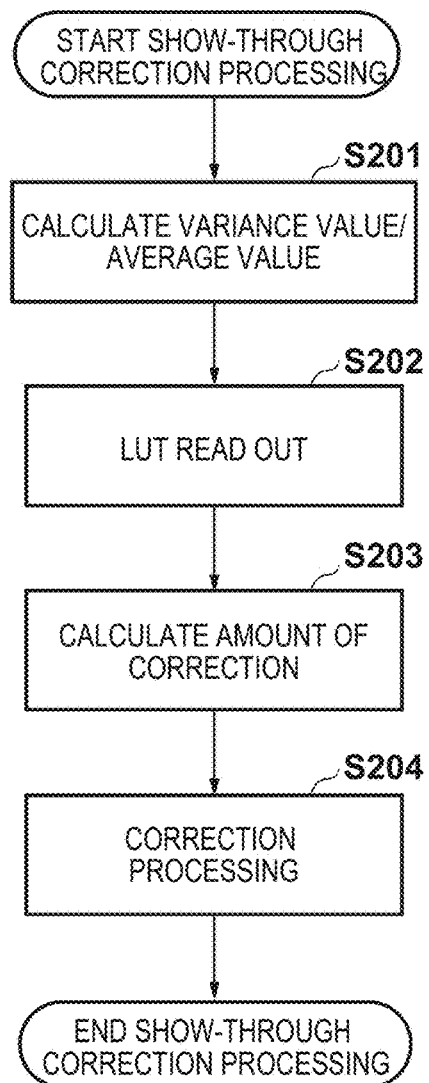
FIG. 10
FIG. 11

F I G. 19
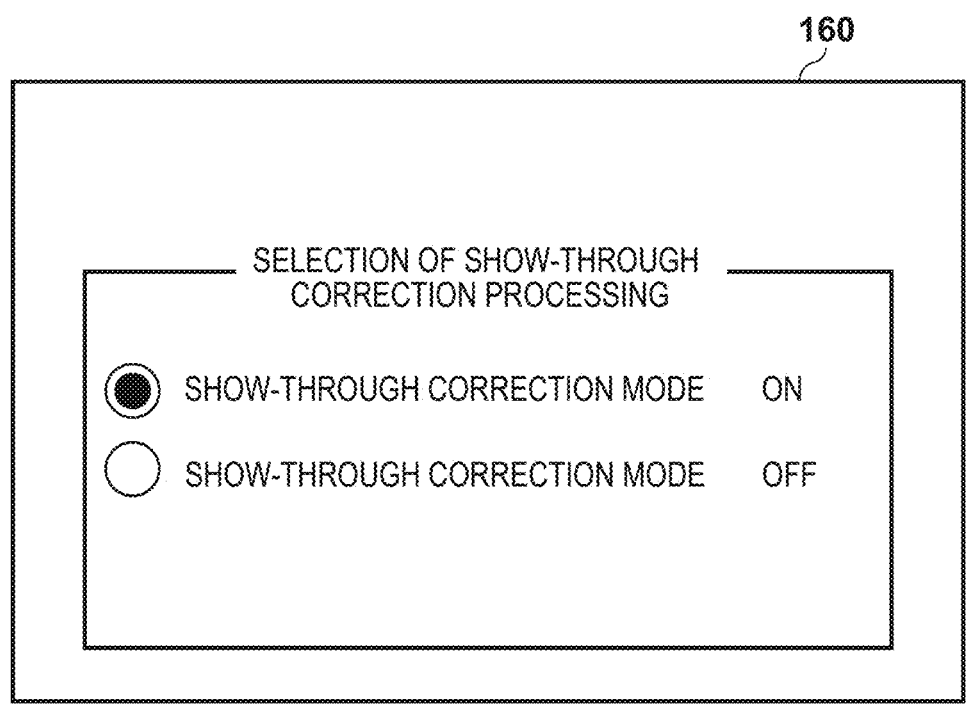

IMAGE PROCESSING APPARATUS METHOD AND MEDIUM CORRECTING VALUE OF PIXEL OF INTEREST IN IMAGE DATA USING DETERMINED AMOUNT OF CORRECTION

BACKGROUND OF THE INVENTION

Field of the Invention

The present invention relates to an image processing technique for correcting an image obtained by reading an original.

Description of the Related Art

In copying machines, multi-function peripherals, and the like there are cases in which a problem known as show-through occurs in a case where an original is read using an image reading apparatus (scanner) installed therein. Show-through is something in which an image on the other surface (a back surface) of the original appears in the read-in image, in a case where a surface of the original (a front surface) is read by an image reading apparatus. Thus, this mainly occurs in cases in which both surfaces (front surface and back surface) of the original that is read by the image reading apparatus have some kind of image printed on them. Show-through tends to occur in cases where a high density image exists on the back surface. Also, this occurs due to the light source, the light amount when reading, and the thickness of the medium of the read-in original (sheet, or the like) (conditions of light penetration). When show-through occurs, an image within the read-in image becomes difficult to see, i.e. the quality of the image deteriorates.

There are cases in which, as a technique for reducing show-through in a read-in image, processing for reducing the density of the image on the whole (strongly applying a so-called background removal function) is used. However, in such cases, not just the show-through but also the density of the image that exists on the front surface of the original is reduced. For this reason, there is a possibility that low-density images will be lost.

In Japanese Patent Laid-Open No. 2012-160883 (patent document 1), for example, a technique is proposed in which a variance value in a fixed range including a pixel of interest is obtained, and when the variance value is not greater than a predetermined reference value, show-through deletion processing is executed. This is processing that focuses on the fact that a low-density portions of the image are expressed in halftone dots, and is something that uses a characteristic that the variance value increases when image data of an area is expressed as halftone dots. The show-through component tends not to be expressed as halftone dots from the perspective of the front surface, and so the variance value is lower. Therefore, dividing up of whether the image is a show-through component or whether the front surface is a low-density portion is performed based on whether or not the variance value is less than or equal to a reference value, and show-through deletion processing is executed only on the show-through components.

However, in magazines and pamphlets comprising mediums (sheets) which have a thin thickness, in a case where an image of a low-density or a medium-density portion (halftone dot region) exists on the front surface, show-through occurs in a way in which the image is overlapped. For a show-through component that occurs in a way in which the low-density or medium-density portion of the image on the front surface is overlapped, the variance value becomes larger, and so this kind of show-through component cannot be appropriately deleted with the above described technique disclosed by patent document 1.

SUMMARY OF THE INVENTION

According to one aspect of the present invention, an image processing apparatus, comprises: a storage unit configured to store an index value for each of a plurality of mutually differing degrees of variation; a first obtainment unit configured to obtain a degree of variation of signal values included in a region of interest of a predetermined size including a pixel of interest included in image data; a second obtainment unit configured to obtain a value indicating a brightness of the region of interest; a determination unit configured to determine an amount of correction of a value of the pixel of interest using the value obtained by the second obtainment unit and an index value corresponding to the degree of variation obtained by the first obtainment unit that is stored by the storage unit; and a correction unit configured to correct the value of the pixel of interest using the amount of correction determined by the determination unit.

According to another aspect of the present invention, an image processing apparatus, comprises: a storage unit configured to store an average value for luminance for each of a plurality of mutually differing variance values; a first obtainment unit configured to obtain a variance value of a density or a luminance of a region of interest of a predetermined size including a pixel of interest included in image data; a second obtainment unit configured to obtain an average value of luminance of the region of interest; a determination unit configured to determine an amount of correction of a value of the pixel of interest using the average value of luminance obtained by the second obtainment unit and an average value of luminance corresponding to the variance value obtained by the first obtainment unit that is stored by the storage unit; and a correction unit configured to correct the value of the pixel of interest using the amount of correction determined by the determination unit.

The present invention preferably reduces show-through in an image obtained by reading an original.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view for showing a relationship of average values and variance values of luminance values in read-in image data.

FIG. 9 is a view for showing an example of an LUT stored in a storage unit.

FIG. 10 is a flowchart for LUT update processing for show-through correction.

FIG. 11 is a flowchart for show-through correction processing.

FIG. 19 is a view for showing an example of a display for receiving a selection of whether or not to execute the show-through correction processing.

DESCRIPTION OF THE EMBODIMENTS

Below, detailed explanation will be given for suitable embodiments of the present invention with reference to the drawings. Note that the following embodiments are only examples, and the present invention is not limited to the scope of the embodiments.

First Embodiment

Figure 1:
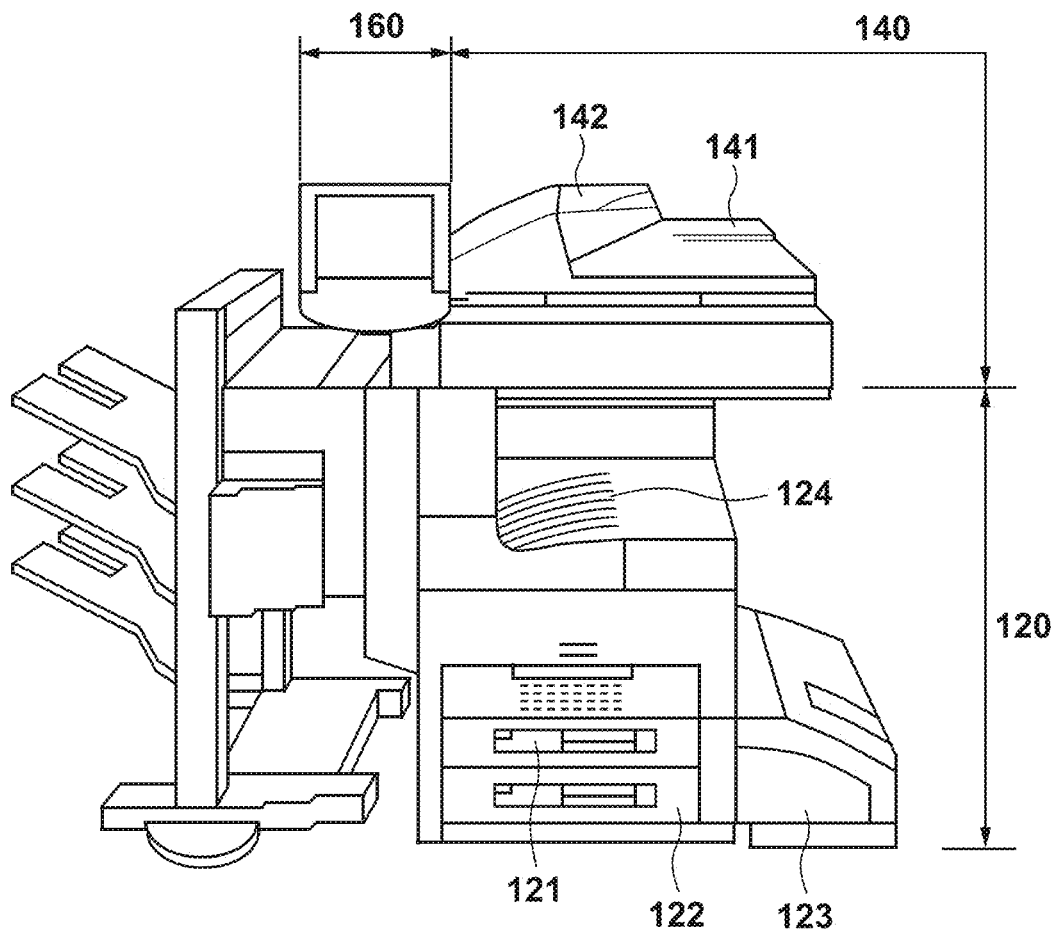
FIG. 1 is a view for showing explanatorily an outer appearance of a copying machine according to a first embodiment.

An explanation is given below with an example of a copying machine as a first embodiment of an image processing apparatus according to the present invention.
<Apparatus Configuration>
<Outer Appearance of the Copying Machine>
FIG. 1 is a view for showing explanatorily an outer appearance of a copying machine according to a first embodiment. The copying machine, in accordance with a copy instruction received from a user via an operation unit 160 reads, by a scanner unit 140, an original set in an original feeder 141, performs by a printer 120 image forming on a sheet of the read in image, and outputs.

The scanner unit 140, which is an image reading unit, by inputting reflected light obtained by exposure scanning an image on an original by a light emission from an illumination lamp into a linear image sensor (CCD sensor), converts information of the image into an electrical signal. The scanner unit 140 further converts the electrical signal into a luminance signal comprising the colors R, G, and B, and outputs the luminance signal to a later described controller 200 as image data.

An original is set in a tray 142 of the original feeder 141. When the user instructs from the operation unit 160 a read initiation, the controller 200 sends an original read-in instruction to the scanner unit 140. The scanner unit 140, when it receives the read instruction, performs an operation of reading originals by feeding the originals one at a time from the tray 142 of the original feeder 141. Also, it is possible to cause an original to be read by placing it on a later described original platen glass.

The printer 120 is an image forming device for forming image data received from the controller 200 on a sheet. Here, explanation is given with an electrophotographic method that uses a photosensitive drum, a developing device, a fixing device, or the like, as something that performs image forming. The electrophotographic method is a method for transferring toner which is caused to adhere to the drum, and causing it to be fixed. Also, because the printer 120 handles differing sheet sizes and differing sheet orientations, it is equipped with a plurality of sheet cassettes 121, 122, and 123. Sheets are discharged to a discharge tray 124 after image forming.

<Scanner Unit>

Figure 2:
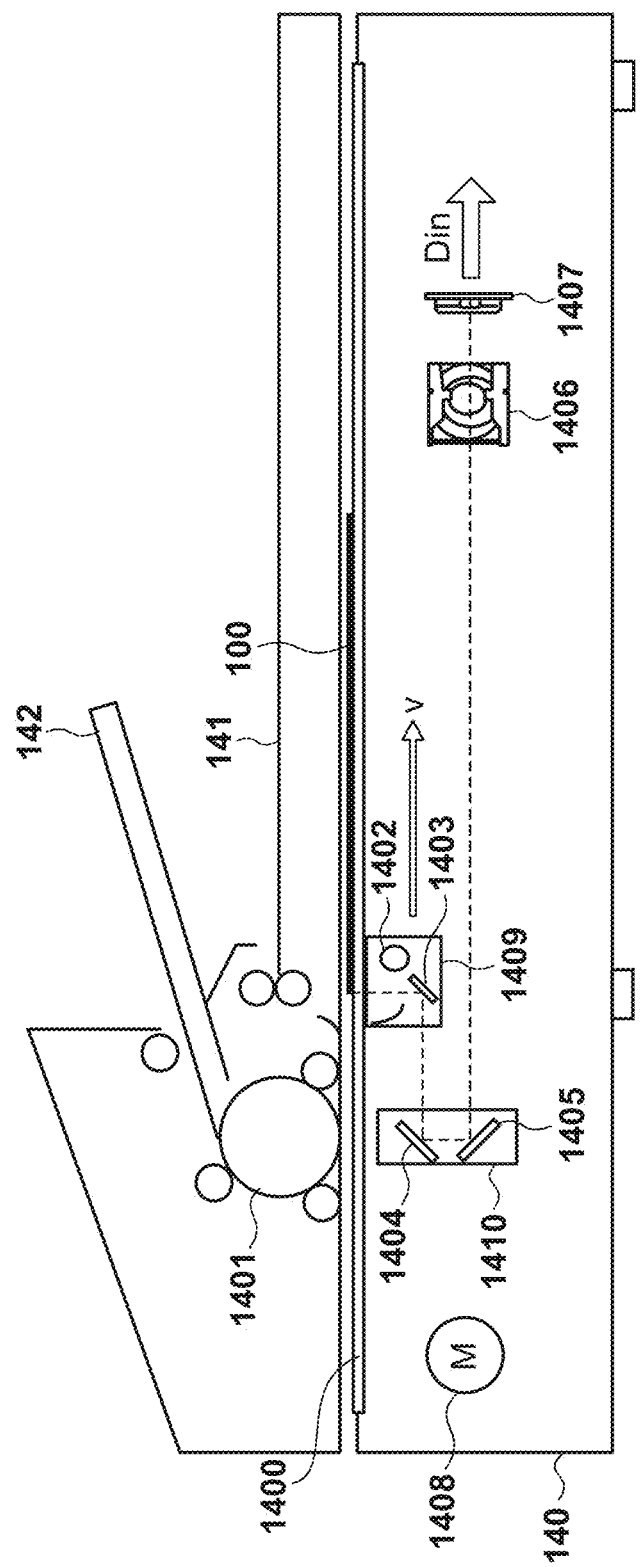
FIG. 2 is a cross-sectional view for showing explanatorily a configuration of a scanner unit.

FIG. 2 is a cross-sectional view for showing explanatorily a configuration of a scanner unit. Here, a main configuration of the scanner unit 140 which uses a linear image sensor is shown.

An original platen glass 1400 has an original 100 to be read placed upon it. The original 100 is irradiated by an illumination lamp 1402, and an image is formed on a CCD sensor 1407 by reflection light passing through a lens 1406 via mirrors 1403, 1404, and 1405. By a first mirror unit 1409, which includes the mirror 1403 and the illumination lamp 1402 moving at a velocity v, and a second mirror unit 1410 which includes the mirrors 1404 and 1405 moving at a velocity ½ v, the front surface of the original 100 is scanned. The first mirror unit 1409 and the second mirror unit 1410 are driven by a motor 1408. The reflected light which is input into the CCD sensor 1407 is converted by the sensor into an electrical signal, and the electrical signals for its pixels are converted into digital data by an A/D converter (not shown), and input into the later described controller 200 as pixel signal Din.

Also, it is possible for the scanner unit 140 to cause a reading operation to be performed by flow reading in which an original is read by causing the original feeder 141 to move. In flow reading, firstly, the original 100 is placed on the tray 142. Then, the original is caused to be conveyed onto the original feeder 141 from the tray 142, first along the surface of the original platen glass 1400 (the bottom part of a driving roller 1401) by the driving roller 1401. In the flow reading, optical systems of the first mirror unit 1409 and the second mirror unit 1410 are set to fixed positions and are not caused to move. In other words, the first mirror unit 1409 is fixed at a position at the bottom part of the driving roller 1401, and reads the original which is conveyed to the bottom part of the driving roller 1401 by the driving roller 1401. In this flow reading, because the original may be caused to move only unidirectionally, it is possible to consecutively read a large number of originals at a high speed.

Note, there are cases where some images such as a photograph, a graph, a character, or the like are printed on not only a surface of the original 100 to be read (the surface on which light is irradiated by an illumination lamp 1402), but also the surface which is not read (the back surface). At this time, there are cases in which "a show-through", wherein an image on the surface which is not read (the back surface) has an effect on read-in image data on the surface, occurs. This can occur in both of the read approaches described above. Then the level of a show-through varies with the thickness of a medium such as a paper of the original 100 (transmittance of light) or with the light intensity irradiated by the illumination lamp 1402. In general, the level of the show-through becomes large when a thin paper is used for the original or the irradiated light intensity is high. Also, the show-through is influenced by density values of an image printed on a back surface, and the show-through tends to occur when a high density image is printed.

<Copying Machine Hardware Configuration>

Figure 3:
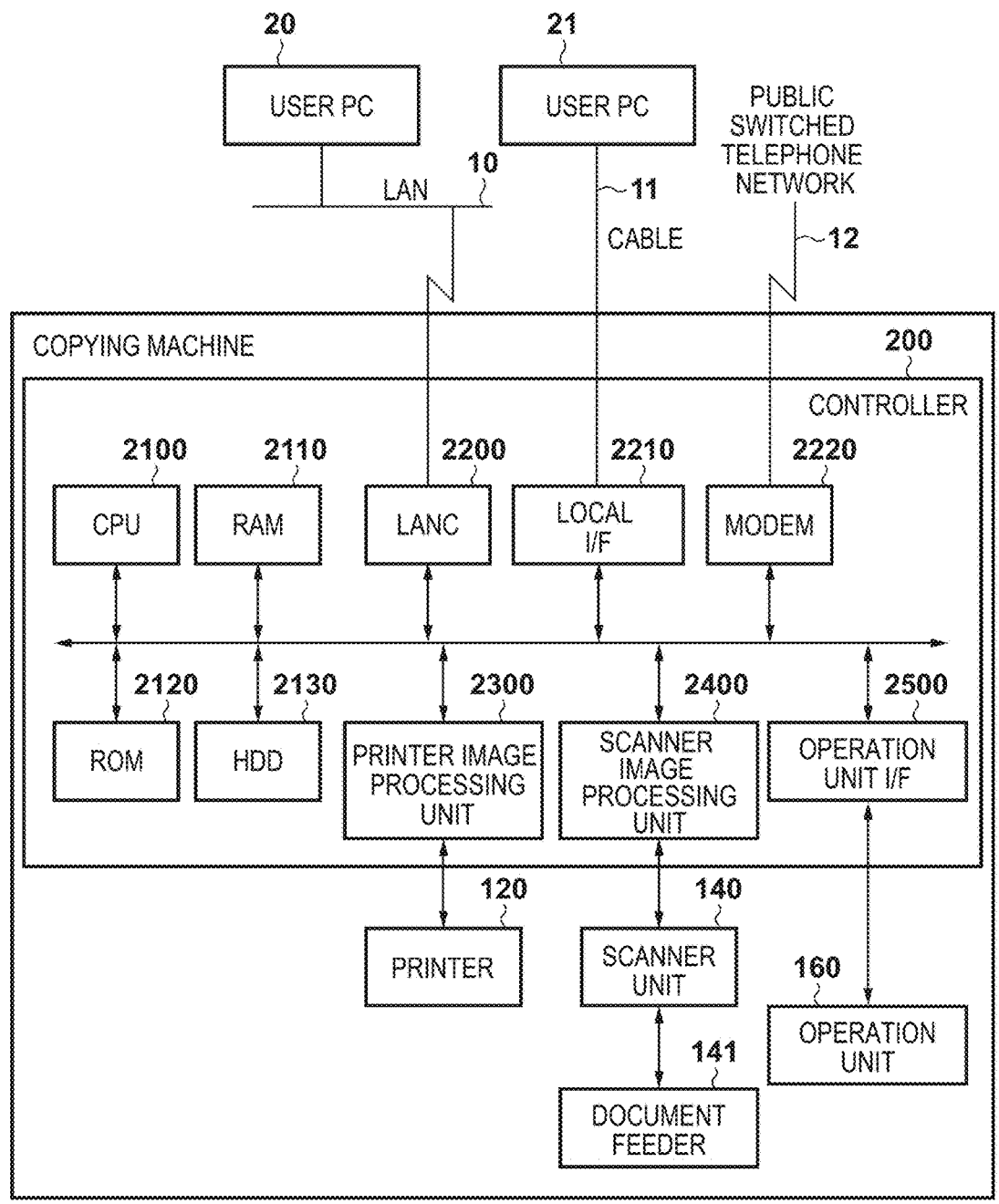
FIG. 3 is a view for showing explanatorily a hardware configuration of the copying machine.

FIG. 3 is a view for showing explanatorily a hardware configuration of the copying machine. The controller 200 is connected to the scanner unit 140, which is an image input device, the printer 120, which is an image output device, a LAN 10, and a public switched telephone network (WAN) 12, and controls operation of the copying machine comprehensively, in addition to performing input/output control of image information and device information.

A CPU 2100 is a processor for controlling the copying machine on the whole, and for example, the CPU 2100 controls access to various connected devices comprehensively based on control programs stored in a ROM 2120. Additionally, the CPU 2100 controls comprehensively various image processing performed within the controller 200. A RAM 2110 is a system work memory, and is also an image memory for temporarily storing image data, or the like. The ROM 2120 is a boot ROM, and stores a system boot program. A hard disk drive (HDD) 2130 mainly stores information necessary for activating/operating a computer (system software), image data, or the like. This data is not limited to the HDD 2130, and may be stored in a recording medium capable of storing and holding the data even if a power supply is cut off.

The LAN controller 2200 connects the copying machine to the LAN 10, and performs input/output of information for input/output of image data for output, device control, or the like, with a user PC 20. A local interface (I/F) 2210 is an interface of USB, Centronics, or the like, which connects to a user PC 21 via a cable 11, and performs input/output of data. A MODEM 2220 connects the copying machine to the public switched telephone network 12, and performs input/output of data with a PC at remote location (not shown).

A printer image processing unit 2300 connects to the printer 120, and performs communication with a CPU mounted in the printer 120. Also, the printer image processing unit 2300 performs conversion between a synchronous system and an asynchronous system for image data, and image processing for print output in accordance with a command of the CPU 2100. A scanner image processing unit 2400 connects to the scanner unit 140, and performs communication with a CPU mounted in the scanner unit 140. Also, the scanner image processing unit 2400 performs image processing such as conversion between a synchronous system and an asynchronous system for image data, and later explained show-through correction processing An operation unit interface (I/F) 2500 is an interface for outputting image data displayed on the operation unit 160 from the controller 200 to the operation unit 160. Also, the operation unit interface (I/F) 2500 is an interface for outputting information that a user inputs into the controller 200 via the operation unit 160.

<Scanner Image Processing Unit>

Figure 4:
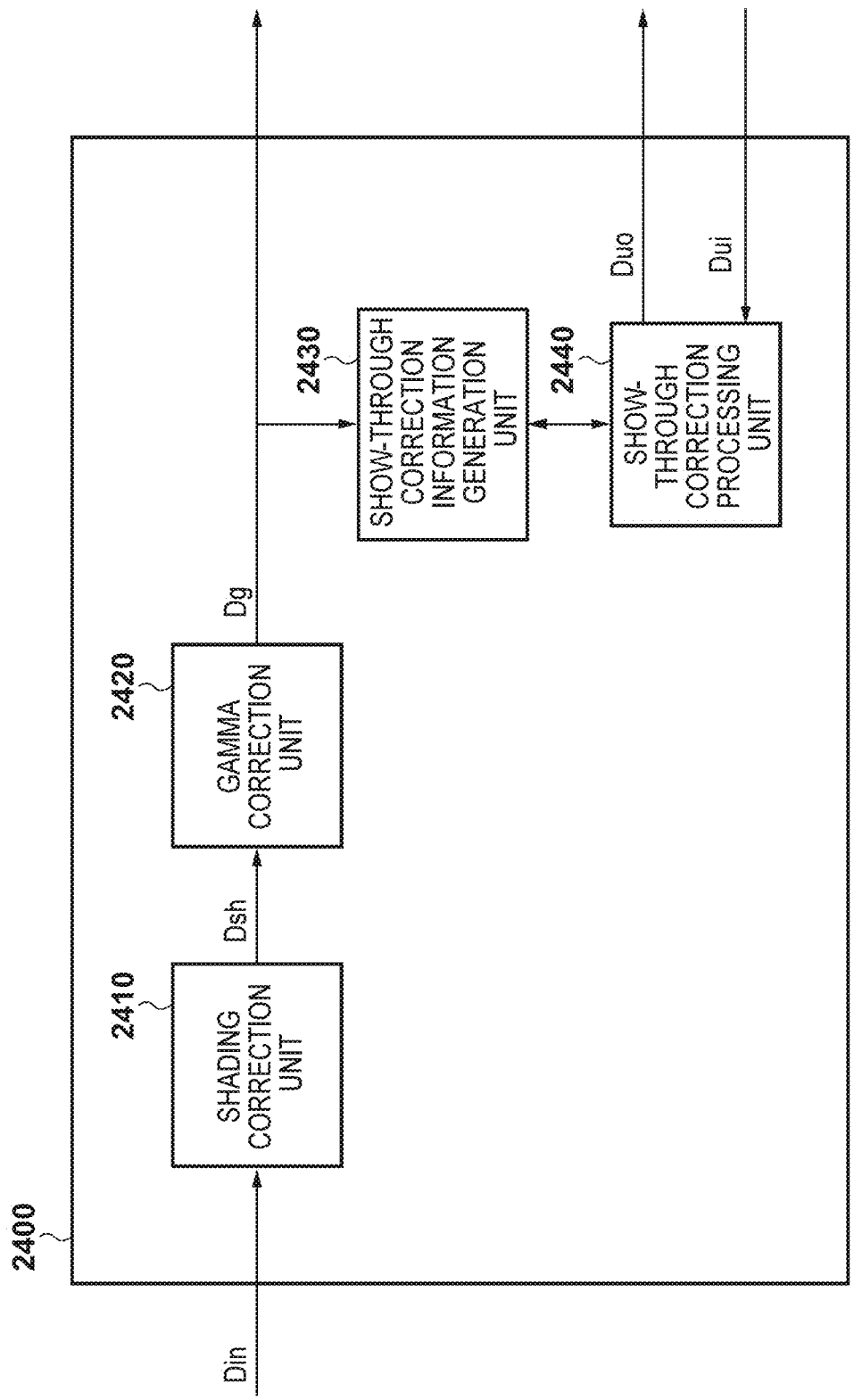
FIG. 4 is a block diagram for showing a configuration of a scanner image processing unit.

FIG. 4 is a block diagram for showing a configuration of the scanner image processing unit 2400 in the first embodiment. A shading correction unit 2410 receives as input a pixel signal Din that indicates a luminance that the scanner unit 140 outputs. The shading correction unit 2410 applies correction processing to luminance irregularities due to the characteristics of an optical system or an imaging system using a known technique so as to get an image having a uniform brightness. A pixel signal Dsh for which shading correction processing has been applied is outputted to a downstream gamma correction unit 2420.

The gamma correction unit 2420 performs correction in order to compensate for a difference between a color characteristic of a read-in element and a color characteristic of the device using a known technique. A pixel signal Dg for which the gamma correction processing is applied is output from the scanner image processing unit 2400, written to the RAM 2110, and temporarily stored. In addition, in parallel, the pixel signal Dg is outputted to a show-through correction information generation unit 2430.

The show-through correction information generation unit 2430 generates and stores information necessary for a show-through correction from the pixel signal Dg. The show-through correction information that is generated is a value that is an index for a show-through correction, and the information is stored in a storage unit such as an SRAM comprised internally, or the like. Detailed explanation will be given later for ways to generate the show-through correction information. The show-through correction information, in accordance with a request from a show-through correction processing unit 2440, is outputted appropriately to the show-through correction processing unit 2440.

The show-through correction processing unit 2440, in a case where a show-through occurs in read-in image data on a surface of an original read in by the scanner unit 140, executes processing for reducing an influence of the show-through on the read-in image data. More specifically, a pixel signal Dui of image data read out from the RAM 2110 is received, and a pixel signal Duo of image data after show-through correction processing is written back to the RAM 2110. In the show-through correction processing, the previously described show-through correction information generation unit 2430 uses the show-through correction information which is an index of a correction that is generated. Thus, the show-through correction processing unit 2440 outputs a request for show-through correction information obtainment to the show-through correction information generation unit 2430 appropriately. Here, the image data read out from the RAM 2110 is the same as image data that the gamma correction unit 2420 outputs from the scanner image processing unit 2400. The reason that storage into the RAM 2110 is performed first, and the input timing of the pixel signal Dui into the show-through correction processing unit 2440 is caused to be delayed is that the show-through correction processing is executed after the generation of the show-through correction information has completed.

<Show-Through Correction Information Generation Unit>

Figure 5:
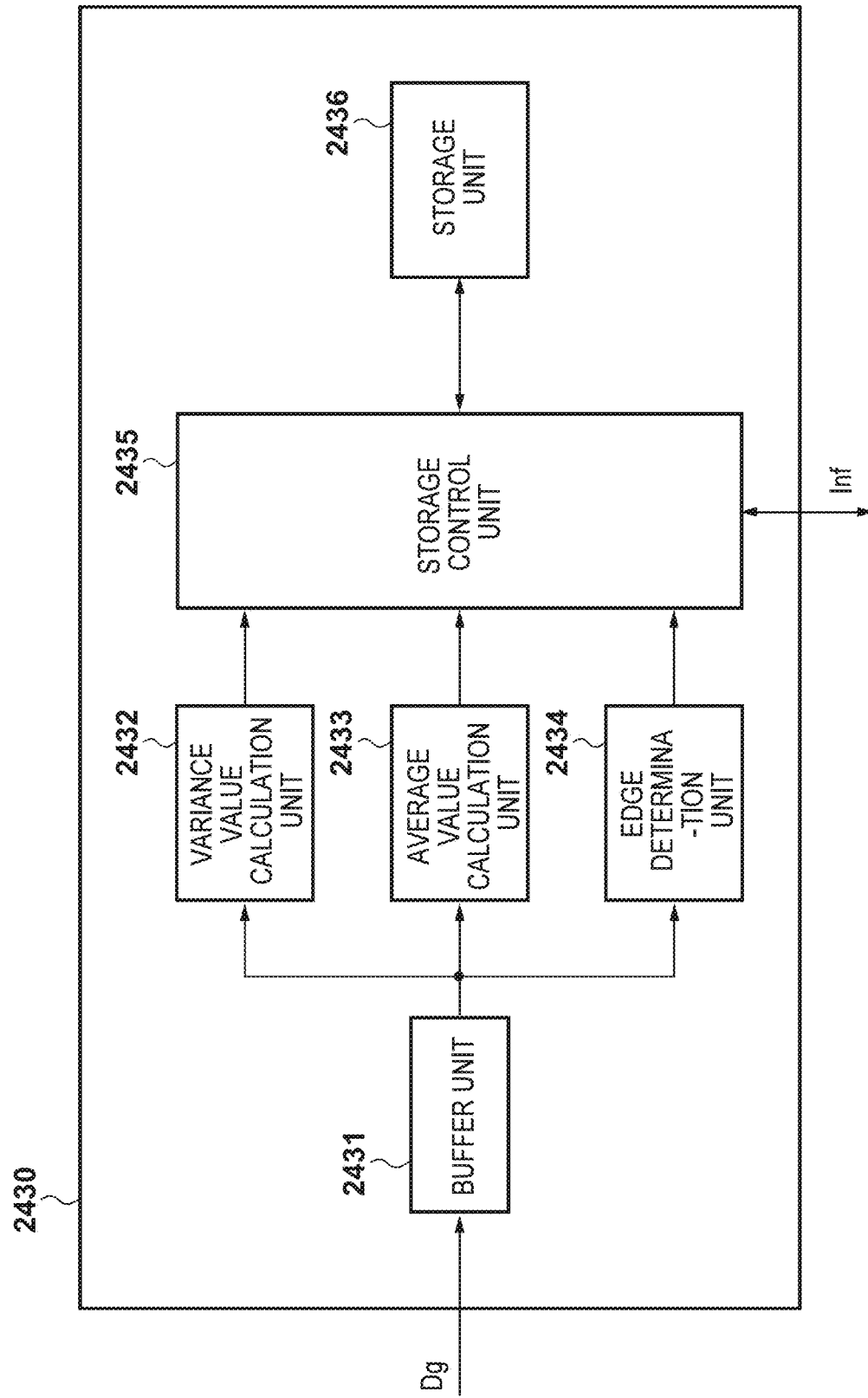
FIG. 5 is a block diagram for showing a detailed configuration of a show-through correction information generation unit.

FIG. 5 is a block diagram for showing a detailed configuration of the show-through correction information generation unit 2430. A buffer unit 2431 is a buffer for temporarily storing the pixel signal Dg. This buffer is for calculating variance values and average values, which is executed at a subsequent stage, and referencing, in an edge determination, a pixel signal in a window of a predetermined size, the center point of which is a pixel of interest. For example, in processing of a subsequent stage, in a case where a pixel signal within a 5×5 window is referenced, the buffer size has a 5 line configuration, and in the case of a 7×7 window, the buffer size has a 7 line configuration.

A variance value calculation unit 2432 collectively receives pixel signals for a window size necessary for the calculation from the buffer unit 2431, and executes the calculation of variance values (degree of variation). For example, a variance value is calculated in accordance with Equation 1 below.

$$\text{The variance value } (\sigma^2) = \frac{1}{N}\sum_{k=1}^{N}(x_k - x_a)^2 \quad \text{Equation 1}$$

Here

N: the number of pixels in the window of interest
Xk: the kth pixel signal value in the window of interest
Xa: the average value of the pixel signal values in the window of interest. Additionally, the variance value ($\sigma^2$) may be replaced by a standard deviation value ($\sigma$) since the value tends to become large.

For an average value calculation unit 2433, pixel signals for the window size necessary for the calculation are received from the buffer unit 2431 collectively, and the calculation of the average value as a representative value that represents the pixel values of that window size is executed. For example, the average value is calculated in accordance with Equation 2 below.

$$\text{Average value } (x_a) = \frac{1}{N}\sum_{k=1}^{N} x_k \quad \text{Equation 2}$$

The definitions of the parameters are the same as in Equation 1. Note, it is set so that the window size necessary for the average value calculation and the window size necessary for the variance value calculation are the same.

An edge determination unit 2434 collectively receives pixel signals for a window size necessary for the calculation from the buffer unit 2431, and executes a determination as to whether or not the pixel of interest is an edge region. The edge determination may be something that is performed using a known technique. Specifically, it is something that determines whether or not the pixel of interest is a region existing on the image edge by applying a Prewitt filter, a Sobel filter, or the like, to the window whose center point is the pixel of interest, and performing a threshold determination for the calculation result.

In a storage control unit 2435, writing and reading out of data with respect to a storage unit 2436 is controlled. Here, in the storage unit 2436, the variance values obtained by the variance value calculation unit 2432 and the average value calculated by the average value calculation unit 2433 are stored. In particular, in the explanation below, explanation is given having an average value be stored for each variance value in a look-up table (LUT) format. For example, the variance value is an address in the LUT, and the average value is stored as data corresponding to the address (variance value).

More specifically, the storage control unit 2435 refers to a result of an edge determination that the edge determination unit 2434 outputs, and confirms whether or not a region exists at the image edge. If the region does exist at the image edge, writing of data to the storage unit 2436 is not performed. On the other hand, in a case where it is not a region existing at the image edge, the storage control unit 2435 reads out from the storage unit 2436 the average value associated with the variance value that the variance value calculation unit 2432 outputs. In other words, data (the average value) is read out by accessing the address of the LUT that has the same value as the referenced variance value.

The storage control unit 2435 compares the read out average value and the average value that the average value calculation unit 2433 outputs. Then, in a case where the average value that the average value calculation unit 2433 outputs is larger, the storage control unit 2435 writes the larger average value to the storage unit 2436. In other words, the data of the address of the read out LUT is updated with the larger value. By performing this kind of processing on all of the pixel positions of the original, the largest average value for each variance value in the original is stored in the storage unit 2436. In this way, the largest average value for each stored variance value becomes show-through correction information Inf. Also, the storage control unit 2435, in accordance with a request from the show-through correction processing unit 2440 which is explained later, reads out an average value corresponding to a predetermined variance value, and is concurrently responsible for processing for outputting to the show-through correction processing unit 2440. Here, explanation will be given for the meaning of the show-through correction information Inf with reference to FIG. 7.

Figure 7:
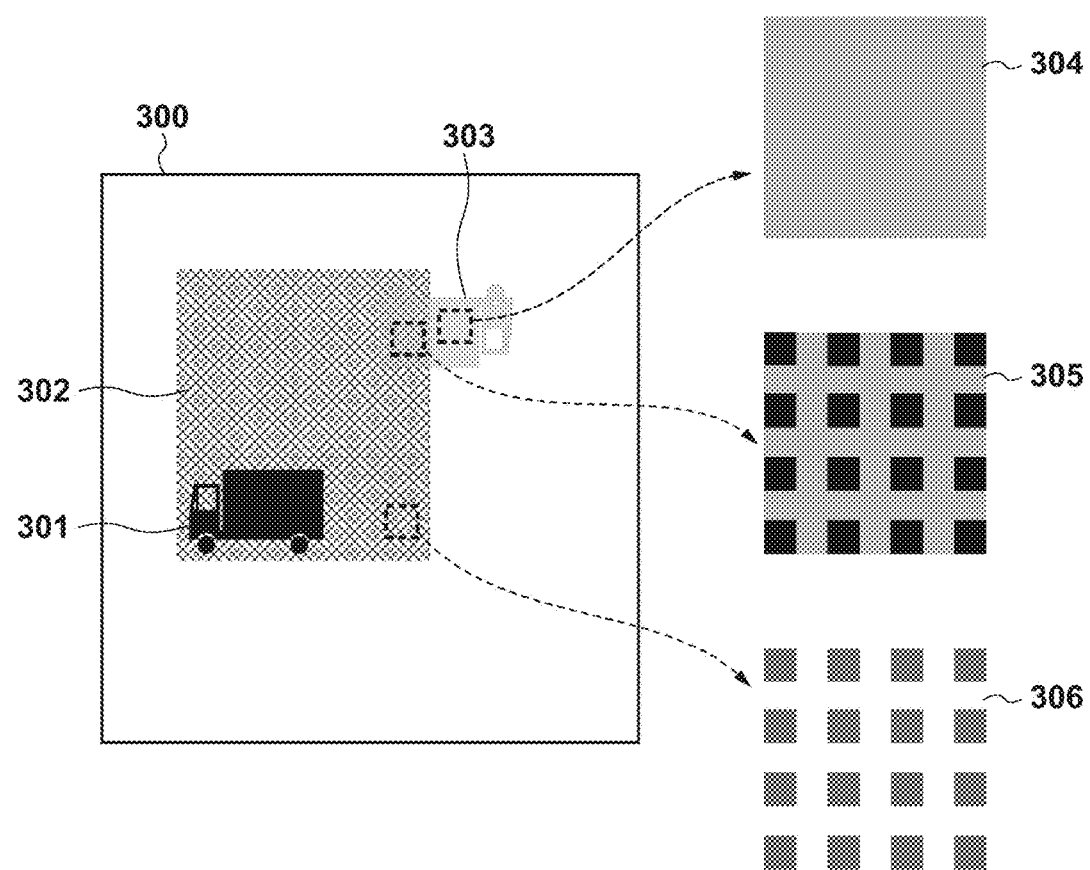
FIG. 7 is a view for showing explanatorily read-in image data.

FIG. 7 is a view for showing explanatorily read-in image data 300 obtained by reading the original 100 with the scanner unit 140. More specifically, the read-in image data 300, in which a show-through image 303 is included, is shown. In FIG. 7, halftone dots generated due to dither processing in which a dither matrix is used by a printer are printed on the original 100. Additionally, the halftone processing in the printer is not limited to the dither processing, and may be error diffusion processing. Even in a case where halftone dots generated by the error diffusion processing are printed on an original, the show-through correction processing of this embodiment can be applied.

Only a high density image 301 (an image of a truck) and a halftone image 302 (rectangle image) expressed by halftone dots are image formed on the front surface of the original 100. Also, it is assumed that an image that is similar to the high density image 301 is image formed on the back surface of the original 100 (the opposite surface to the surface that is read in by the scanner). Here, the high density image that exists on the back surface of the original 100 is the show-through image 303 (an inverted truck image) appears in the read-in image data 300 read in by the scanner unit 140. Explanation will be given for characteristics of the regions of the read-in image data 300.

A magnification view that focuses on a region of the halftone image 302 is illustrated as a halftone region of interest 306. The halftone region of interest 306 is of a halftone dot construction, and pixels are divided into those in regions in which there is a halftone dot, and those in regions in which there is no halftone dot. Here, these regions are delimited by a predetermined window size, and the variance value and the average value of pixel density are calculated, and the variance value is made to be "X2" and the average value is made to be "Y2". Here, for the window size, a 5 pixel×5 pixel size is specified as the size of one halftone dot as a pixel standard, for example.

A magnification view that focuses on a region of the show-through image 303 is illustrated as a show-through region of interest 304. In the show-through region of interest 304, the region is delimited by a predetermined window size, and pixel density variance value and average value are calculated, and the variance value is set to be "X1" and the average value is set to be "Y3". Here, the variance value "X1" obtained in the show-through region of interest 304 is a small value. This is because, in general, only a low frequency component of the image on the back surface (an image component that is obtained through the transparent paper) tends to appear as a show-through component. For this reason, if the image on the back surface corresponding to the show-through image 303 were drawn in halftone dots, it is often the case that for the show-through component it would occur without an unevenness in density (luminance), and as a result, the variance value would be a small value.

Also, it is assumed that a variance value and an average value obtained for a paper white region, in which no image exists, and for which there is no show-through, obtained for a delimiting predetermined window size in the read-in image data 300 are "X1" and "Y4" respectively. Additionally, as described above, because the show-through component tends not to influence the variance value, the variance value for a paper white region and the variance value obtained from a region of the show-through image 303 tends to be a similar value. For this reason, it is assumed that the variance value is "X1" which is common here.

A magnification view in which a region in which the halftone image 302 and the show-through image 303 are overlapping is focused on is illustrated as an overlapping region of interest 305. The overlapping region of interest 305 is divided for each pixel into regions in which there is a halftone dot and regions in which there is no halftone dot because it is of a halftone dot construction. However, because of the influence of the show-through image, the pixel values are dark (low luminance) on the whole. In the overlapping region of interest 305, the region is delimited by the predetermined window size, the pixel density variance value and average value are calculated, and the variance value is set to be "X2" while the average value is set to be "Y1". Additionally, as described above, because the show-through component tends not to have an influence on the variance value, the variance value of the overlapping region of interest 305 tends to be a similar value to the variance value obtained from the halftone region of interest 306 of the halftone image 302 in which there is no show-through. For this reason, it is assumed that the variance value is "X2" which is common here.

FIG. 8 is a view for showing a relationship between the variance values X1 and X2 and the average values Y1-Y4 in the read-in image data 300. In FIG. 8, the coordinate (X1, Y4) indicates the paper white region, the coordinate (X1, Y3) indicates the show-through region of interest 304, the coordinate (X2, Y2) indicates the halftone region of interest 306, and the coordinate (X2, Y1) indicates the overlapping region of interest 305. In other words, it can be said that the paper white region is the coordinate (X1, Y4), and the coordinate (X1, Y3) is for where the show-through occurs in the paper white region. Also, it can be said that the halftone region of interest 306 is the coordinate (X2, Y2), and the coordinate (X2, Y1) is for where the show-through occurs in the halftone region. The average values of FIG. 8 are average values of brightness (for example, luminance), and so this means that Y4 has a higher luminance than Y1.

Thus, if the pixel of interest is corrected using the amount of difference between Y3 and Y4 in the show-through region of interest 304, the signal value of the show-through region will be corrected to the signal value of the paper white region, and the show-through correction will be performed appropriately. Also, if the pixel of interest is corrected using the amount of difference between Y1 and Y2 in the overlapping region of interest 305, the signal value of the overlapping region is corrected to the signal value of the halftone region of interest, and the show-through correction is performed appropriately. In other words, it is possible to make the average value of a region for which there is no show-through be an index for correcting the show-through (i.e. show-through correction information Inf) in each of the variance values.

Here, the variance values are dependent upon the amount of halftone dots in the region of interest. The amount of halftone dots is shown in a percentage (0-100%) with respect to a total pixel count of the region of interest of significant pixels included in the region of interest, for example, and is determined uniquely in accordance with the image density. Thus, it can be seen that even in a case where a show-through region or a region in which a show-through and a halftone dot on the front surface are overlapping occurs, the show-through can be corrected appropriately by correcting the signal value by making an average value where there is no show-through be an index for each variance value. Note, "storing the average value for each variance value" in other words means "storing the average value of each halftone dot amount".

However, in order to obtain an appropriate index, it is necessary to obtain an average value of a region in which there is no show-through. In order to easily and appropriately obtain this, a highest average value for each variance value in input image data is used as the index, as explained for the storage control unit 2435. Here, the fact that a higher (brighter) average value is taken for a region for which there is no show-through than for a region for which there is a show-through is used. Because it is rare that the entirety of the halftone dot region within the input image data is included in the show-through region, this approach holds up sufficiently in practical use.

Also, there are cases in which the variance value is a value for which there is no relationship with the amount of halftone dots and is due to the influence of a different image region at an image boundary such as an edge portion of an image. Here, an edge detection is performed in the edge determination unit 2434, and processing for excluding a region in which an image edge exists is performed.

Figure 16:
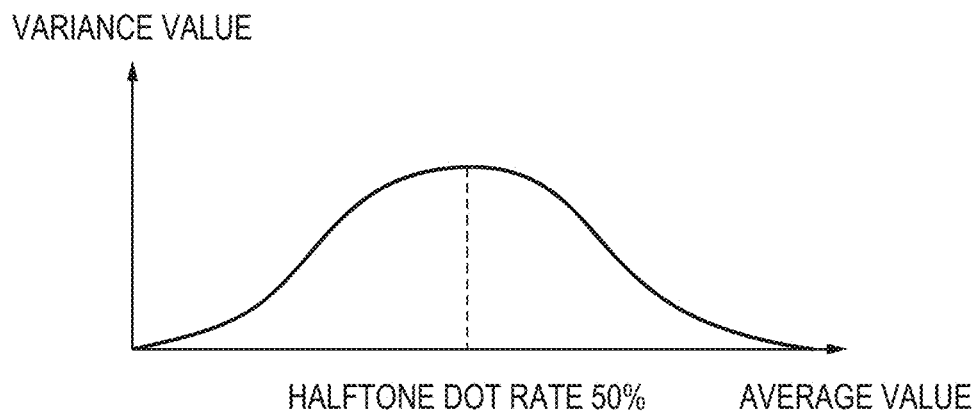
FIG. 16 is a view for showing explanatorily a distribution of variance values with respect to average values.

FIG. 16 is a view for showing explanatorily a distribution of variance values with respect to an average value. In general, for the variance value, a 50% halftone dot amount in the region of interest (window size) is a maximum value peak, and 50% or greater and less than 50% have similar distributions. Also, the variance value is a minimum value when the halftone dot amount is 0% or 100%. In other words, because the two differing average values correspond for the same variance value, the corresponding average value is not determined uniquely.

However, in general, if it is greater than or equal to an intermediate density, the density of the front surface is high, and there tends not to be the influence of show-through. For this reason, the show-through correction processing may be something for which regions for which the halftone dot amount is less than 50% are targeted. In other words, a configuration may be taken in which a point at which the density of the average value is an intermediate density is made to be a boundary and only regions having densities not higher than that are targeted and corrected. In such a case, the average value for a variance value is determined uniquely. Additionally, as another configuration, a gain may be set such that an amount of correction decreases for regions for which the halftone dot amount is greater than or equal to 50%.

Note, in a case where the read-in image data 300 is color image data, the correction processing may be executed individually for each color component (RGB, or the like). For this, an average value for each variance value is stored individually for each a color component in the storage unit

2436. By storing individually for each color component, it becomes possible to correct preferably even if the show-through component is in color (for example a red text show-through component, or the like).

FIG. 9 is a view for showing an example of an LUT stored in the storage unit 2436. The first line indicates the address of the LUT, and the second line indicates the data stored in the LUT. The addresses of the LUT indicate the variance values ($\sigma 2$), but standard deviation values ($\sigma$) may be substituted in order to reduce the numeric value. In other words, the LUT associates the degree of variation (corresponding to a predetermined image density) and a corresponding reference average value.

Here, explanation will be given for the relationship between the variance values and the average values stored in the LUT. For example, when the variance value "0" (the address is "0") is shown, it corresponds to either a portion of all one color or a paper white portion if the influence of show-through is not considered. Here because the average value stored in the LUT is the average value having the highest numeric value (brightest) in the image, necessarily the average value stored at the address where the variance value is 0 is the average value for paper white. Because the number of halftone dots (significant pixels) in the image increases as the variance value (address) increases gradually, the average values that are stored become lower (darker). Thus, the data stored in the addresses of an LUT formed after 1 page of an image is referenced is the values as shown in FIG. 9.

Also, in place of configuring an individual LUT for each color component, configuration may be taken such that an LUT holds dimensions for each of the color components. For example, in the case of RGB where there are 3 components, configuration may be taken such that three-dimensions are comprised in [R variance value][G variance value][B variance value], and an average value is stored for each color.

<Show-Through Correction Processing Unit>

Figure 6:
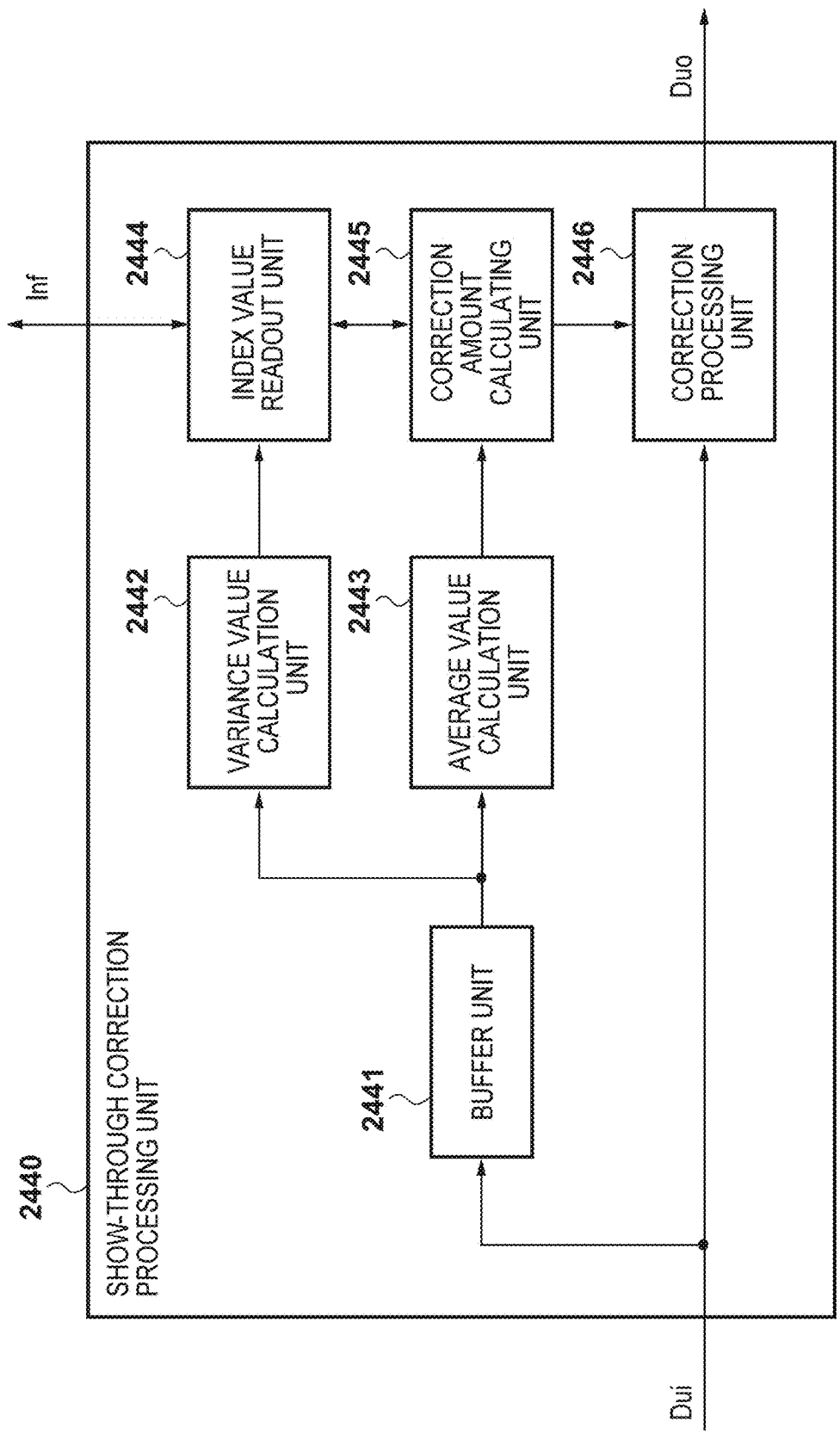
FIG. 6 is a block diagram for showing a detailed configuration of a show-through correction processing unit.

FIG. 6 is a block diagram for showing a detailed configuration of the show-through correction processing unit 2440. As previously explained, the show-through correction processing unit 2440 is something that receives as input the pixel signal Dui of image data read out from the RAM 2110, and writes image data after the show-through correction processing as the pixel signal Duo to the RAM 2110. The show-through correction processing is something that is executed on the image data for which the processing of the show-through correction information generation unit 2430 has completed.

A buffer unit 2441 is a buffer for temporarily storing the pixel signal Dui. The buffer unit 2441, a variance value calculation unit 2442, and an average value calculation unit 2443 in the show-through correction processing unit 2440 are the same as the buffer unit 2431, the variance value calculation unit 2432, and the average value calculation unit 2433 in the show-through correction information generation unit 2430 respectively.

In an index value readout unit 2444, the variance value that the variance value calculation unit 2442 outputs is referenced, and the show-through correction information Inf (average value) that could become the index value for the correction corresponding to the variance value is obtained. More specifically, the show-through correction information Inf obtainment request is transmitted to the show-through correction information generation unit 2430.

The show-through correction information generation unit 2430 reads out the index value for a correction stored in the LUT in the storage unit 2436 when the obtainment request is received. In other words, the show-through correction information generation unit 2430 receives the variance value from the index value readout unit 2444, accesses the address of the LUT that indicates this variance value and reads out the data (the average value). The read out average value is transmitted to the index value readout unit 2444 and used as the show-through correction information Inf.

In a correction amount calculating unit 2445, the amount of correction (the signal value correction amount) for correcting the pixel signal Dui is calculated. More specifically, the processing makes the difference between "the average value by the show-through correction information Inf received from the show-through correction information generation unit 2430" and "the average value in the current region of interest that the average value calculation unit 2443 calculates" to be the amount of correction. Here, because the highest (brightest) average value in the image data is stored for the average value by the show-through correction information Inf, the difference with the region of interest average value is necessarily greater than or equal to 0. This difference is outputted to a correction processing unit 2446 as the amount of correction.

In the correction processing unit 2446, the show-through correction processing is executed for the pixel signal Dui which is input based on the amount of correction received from the correction amount calculating unit 2445. The show-through correction processing makes the pixel signal Dui brighter by adding the amount of correction to the luminance value of the pixel signal Dui, for example. If the inputted pixel signal is a pixel signal for which there is no show-through, the difference is small, and so the amount of correction is small. Also, as previously explained, it is advantageous that the show-through correction processing be something that processes regions for which the halftone dot amount is less than 50% as targets. Also, configuration may be taken such that the amount of correction is not simply added, but rather correction is performed by multiplying a gain in accordance with the inputted pixel signal value. For example because the brighter the input pixel signal value is the more there tends to be an influence of show-through, configuration may be taken such that a gain is multiplied so as to correct, in accordance with brightness of the pixel signal, more strongly the brighter the pixel signal is. The corrected pixel signal value is written back into the RAM 2110 as Duo.

<Apparatus Operation>
<LUT Update Processing>

FIG. 10 is a flowchart for LUT update processing for show-through correction. It becomes possible to store in the storage unit 2436 values that may become the show-through correction information Inf by executing the LUT update processing. The LUT update processing is realized by the CPU 2100 executing a program stored in the HDD 2130, and controlling the scanner unit 140 and the scanner image processing unit 2400 (the show-through correction information generation unit 2430 in particular).

In step S101, the show-through correction information generation unit 2430 executes edge detection processing for a read-in image. Here, in the edge detection processing being executed in the edge determination unit 2434 of the show-through correction information generation unit 2430, a window whose center point is made to be the pixel of interest of the read-in image (the buffer unit 2431 outputs) is referenced, and edge detection is performed by a known technique.

In step S102, the show-through correction information generation unit 2430 references the result of the edge determination of step S101, and determines whether or not the pixel of interest is an edge portion. If it is an edge portion, the processing completes. If it is non-edge, the processing proceeds to step S103.

In step S103, the show-through correction information generation unit 2430 executes a calculation of the variance value and the average value. This is something that the variance value calculation unit 2432 of the show-through correction information generation unit 2430 and the average value calculation unit 2433 execute. The window (the buffer unit 2431 outputs) whose center point is the pixel of interest of the read image is referenced, and the variance value and the average value are calculated.

In step S104, the show-through correction information generation unit 2430 reads out the data from the LUT of the storage unit 2436. Here, because this is something that is executed in the storage control unit 2435, the address of the LUT that is read out is the same as the variance value calculated in step S103.

In step S105, the show-through correction information generation unit 2430 executes a comparison to determine which of the value read out in step S104 or the average value calculated in step S103 is larger. If the value read out in step S104 is larger, the processing completes. If the average value calculated in step S103 is larger, the processing proceeds to step S106.

In step S106, the show-through correction information generation unit 2430 executes the writing (updating) of data to the LUT of the storage unit 2436. The written data is the average value calculated in step S103, and the address to write is the variance value calculated in step S103.

By the above processing, the highest average value for each variance value in the image read into the LUT of the storage unit 2436 is stored. As is explained with reference to FIG. 8, this becomes an index for correcting show-through (i.e. the show-through correction information Inf).

<Show-Through Correction Processing>

FIG. 11 is a flowchart for show-through correction processing. By executing the show-through correction processing, it becomes possible to appropriately correct show-through using the show-through correction information Inf generated in FIG. 10. The show-through correction processing is realized by the CPU 2100 executing a program stored in the HDD 2130, and controlling the scanner unit 140 and the scanner image processing unit 2400 (the show-through correction processing unit 2440 in particular).

In step S201, the show-through correction processing unit 2440 executes a calculation of a variance value and an average value for an image for which the generation of an LUT that may become the show-through correction information Inf has completed. This is something that the variance value calculation unit 2442 of the show-through correction processing unit 2440 and the average value calculation unit 2443 execute. The window (the buffer unit 2441 outputs) whose center point is the pixel of interest of the read image is referenced, and the variance value and the average value are calculated.

In step S202, the show-through correction processing unit 2440 reads out data from the LUT of the storage unit 2436. This is something that is read out by the index value readout unit 2444 accessing the storage control unit 2435, and the addresses of the read out LUT are the same as the variance values calculated in step S201. The read out data is the show-through correction information Inf, and this is the index for correcting show-through.

In step S203, the show-through correction processing unit 2440 calculates the amount of correction for show-through. This is something that is executed in the correction amount calculating unit 2445, and this is something that obtains a difference between the show-through correction information Inf read out in step S202 and the average value calculated in step S201, and that makes that difference be the amount of correction.

In step S204, the show-through correction processing unit 2440 executes show-through correction processing in relation to the input pixel (the pixel of interest in step S201). This is something that is executed in the correction processing unit 2446, that makes the amount of correction calculated in step S203 a base, and adds the amount of correction to the signal value of the pixel that is inputted, for example, thereby brightening the pixel signal Dui. Here, as previously explained, configuration may be taken such that a gain is multiplied in accordance with the amount of correction with the signal value of the input pixel.

By virtue of the first embodiment as explained above, it becomes possible to preferably remove a show-through component for show-through within an image (a halftone dot region) in a read-in image.

Second Embodiment

In the second embodiment, a method and a configuration for executing generation of the show-through correction information that becomes the index for correcting show-through and show-through correction processing in parallel are described. Therefore, while in the first embodiment a processing delay occurs due to the configuration in which the show-through correction processing is executed after the generation of the show-through correction information is completed, the processing delay is reduced by performing parallel processing of the two processes.

In the second embodiment the internal configuration of the scanner image processing unit 2400 and the processing flow pertaining to the show-through correction are different to those of the first embodiment. However, the outer appearance of the copying machine, the configuration of the scanner unit 140, and the configuration of the controller 200 are similar to those of the first embodiment. Below, detailed explanation will be given for the second embodiment within a focus on portions that are different to the first embodiment.

<Scanner Image Processing Unit>

Figure 12:
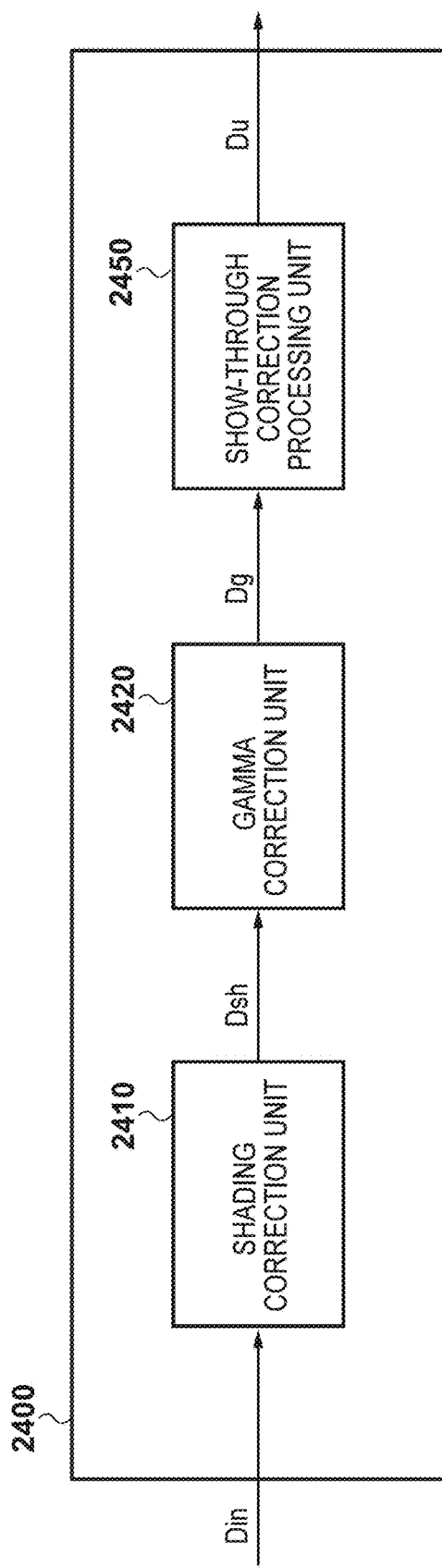
FIG. 12 is a block diagram for showing a configuration of the scanner image processing unit in a second embodiment.

FIG. 12 is a block diagram for showing a configuration of the scanner image processing unit 2400 in the second embodiment. The shading correction unit 2410 and the gamma correction unit 2420 are similar to those in the first embodiment. The pixel signal Dg, which the gamma correction unit 2420 outputs, is input to a show-through correction processing unit 2450.

The show-through correction processing unit 2450 executes processing for reducing a show-through when it occurs in the read-in image data of the front surface of the original read in by the scanner unit 140. Note, the show-through correction processing unit 2450 is something that executes both the generation of the show-through correction information that becomes the index for show-through correction and the show-through correction processing that uses that correction information. The pixel signal Du for which the show-through correction processing has been applied is output from the scanner image processing unit 2400, and written into the RAM 2110 based on the memory controller (not shown).

<Show-Through Correction Processing Unit>

Figure 13:
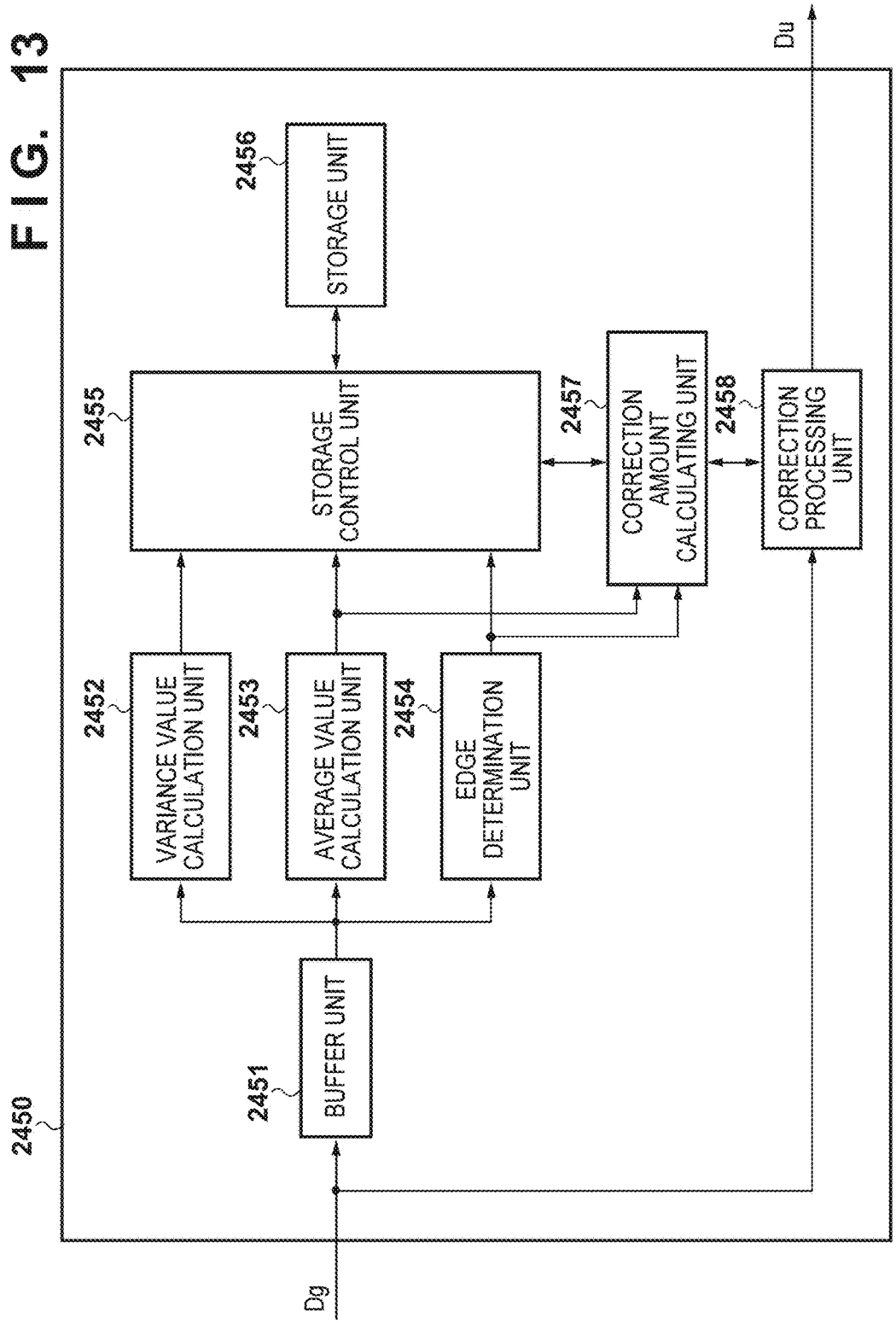
FIG. 13 is a block diagram for showing a configuration of the show-through correction processing unit in the second embodiment.

FIG. 13 is a block diagram for showing a configuration of the show-through correction processing unit 2450 in the second embodiment. A buffer unit 2451, a variance value calculation unit 2452, an average value calculation unit 2453, and an edge determination unit 2454 have the same configuration as the buffer unit 2431, the variance value calculation unit 2432, the average value calculation unit 2433, and the edge determination unit 2434 in the first embodiment.

In a storage control unit 2455, writing and reading out of data with respect to a storage unit 2456 is controlled. In the storage unit 2456, similarly to the first embodiment, an average value for each variance value is stored in an LUT format. Firstly, the storage control unit 2455 confirms whether or not it is an edge region referencing the result of the edge determination that the edge determination unit 2454 outputs. If it is an edge region, writing of data to the storage unit 2456 is not performed. Meanwhile, in a case where it is not an edge region, the storage control unit 2455 references a variance value that the variance value calculation unit 2452 outputs, and reads out an average value stored in the storage unit 2456 that is for the same variance value. In other words, data (the average value) is read out by accessing the address of the LUT that has the same value as the referenced variance value.

The storage control unit 2455 compares the read out average value and the average value that the average value calculation unit 2453 outputs. Then, in a case where the average value that the average value calculation unit 2453 outputs is larger, the storage control unit 2455 writes the larger average value to the storage unit 2456. In other words, the data of the address of the read out LUT is updated with the larger value. Furthermore, the storage control unit 2455 outputs the average value read out from the storage unit 2456 to a correction amount calculating unit 2457.

The correction amount calculating unit 2457 calculates the amount of correction for correction of the pixel signal Dg. More specifically, a difference in the average value in the current region of interest, that the average value calculation unit 2453 calculates, from the average value received from the storage control unit 2455 is taken, and made to be the amount of correction. Note, in a case where the difference is a negative value, it means that the average value in the region of interest is brighter than the average value stored in the storage control unit 2455, and so the amount of correction is set to be 0. This is outputted to a correction processing unit 2458 as the amount of correction.

Also, the correction amount calculating unit 2457 references the result of the edge determination that the edge determination unit 2454 outputs, and refers to whether or not it is a non-edge portion, and if the pixel of interest is an edge portion, it either sets the amount of correction to be 0, or sets the amount of correction to be an amount specified in advance. Also, configuration may be taken such that, for example, the amount of correction for a non-edge portion vicinity is referenced and that amount of correction is outputted to the correction processing unit 2458.

Here, the average value read out from the storage unit 2456 has the meaning of the brightest average value in one or more region that has been processed up until and including the currently processed region of interest (the region including the pixel of interest) out of the image data currently being processed. Thus, if there is a region for which a bright average value where there is no show-through can be obtained for the one or more regions processed in the past, appropriate show-through correction information is stored. This means that compared to the first embodiment the possibility that the show-through correction information can be stored appropriately is reduced. However, because it is rare that only the show-through region continues unbroken in an actual original, it can be considered that the influence of this is small.

In the correction processing unit 2458, the show-through correction processing is executed for the pixel signal Dg which is input based on the amount of correction received from the correction amount calculating unit 2457. The show-through correction processing is something that is similar to that of the first embodiment and that makes the pixel signal Dg brighter by adding an amount of correction to the luminance value of the pixel signal Dg, for example. The corrected pixel signal value is written back into the RAM 2110 as Du.

<Show-Through Correction Processing>

Figure 14:
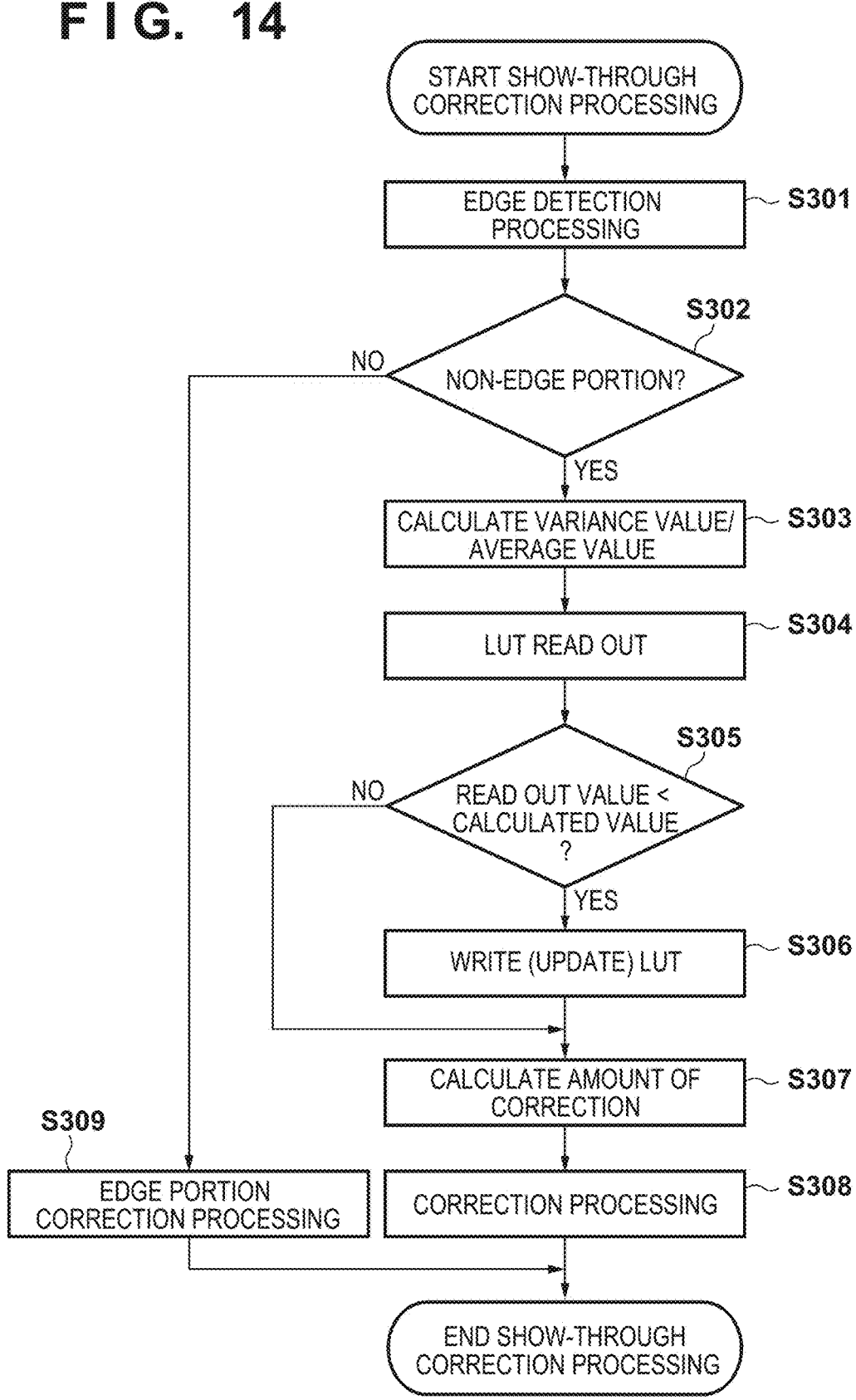
FIG. 14 is a flowchart for LUT update processing in the second embodiment.

FIG. 14 is a flowchart for LUT update processing in the second embodiment. By executing the LUT update processing, it becomes possible to appropriately correct the show-through using the show-through correction information Inf. The LUT update processing is realized by the CPU 2100 executing a program stored in the HDD 2130, and controlling the scanner unit 140 and the scanner image processing unit 2400 (the show-through correction processing unit 2450 in particular).

In step S301, the show-through correction processing unit 2450 executes edge detection processing for a read-in image. This is something that is executed in the edge determination unit 2454, and in which a window (the buffer unit 2451 outputs) whose center point is the pixel of interest of the image that is read is referenced, and an edge detection is performed by a known technique.

In step S302, the show-through correction processing unit 2450 references the result of the edge determination of step S301, and determines whether or not the pixel of interest is an edge portion. In a case where it is determined to be an edge portion, the processing proceeds to step S309. If it is a non-edge portion, the processing proceeds to step S303.

In step S303, the show-through correction processing unit 2450 executes a calculation of the variance value and the average value. This is something that the variance value calculation unit 2452 of the show-through correction processing unit 2450 and the average value calculation unit 2453 execute. The window (the buffer unit 2451 outputs) whose center point is the pixel of interest of the read image is referenced, and the variance value and the average value are calculated.

In step S304, the show-through correction processing unit 2450 reads out data from the LUT of the storage unit 2456. This is something that is executed in the storage control unit 2455, and the address of the LUT that is read out is the same as the variance value calculated in step S303. The data that is read out is the show-through correction information.

In step S305, the show-through correction processing unit 2450 executes a comparison to determine which of the value read out in step S304 or the average value calculated in step S303 is larger. If the value read out in step S304 is larger, the processing proceeds to step S307. If the average value calculated in step S303 is larger, the processing proceeds to step S306.

In step S306, the show-through correction processing unit 2450 executes the writing (updating) of data to the LUT of the storage unit 2456. The written data is the average value calculated in step S303, and the address to write is the variance value calculated in step S303.

In step S307, the show-through correction processing unit 2450 calculates the amount of correction for show-through. This is something that is executed by the correction amount calculating unit 2457, and something that takes the difference between the show-through correction information read out in step S304 and the average value calculated in step S303, and makes that difference be the amount of correction.

In step S308, the show-through correction processing unit 2450 executes show-through correction processing for the input pixel (the pixel of interest in step S301). This is something that is executed in the correction processing unit 2458, that makes the amount of correction calculated in step S307 a base, and adds the amount of correction to the signal value of the pixel that is inputted, for example, thereby brightening the pixel signal Dui. Configuration may be taken such that a gain corresponding to the amount of correction is multiplied with the signal value of the input pixel.

Edge portion correction processing is executed in step S309 in a case where the show-through correction processing unit 2450 is determined to be an edge portion in step S302. This is something that, for example, references the amount of correction of a non-edge portion in the vicinity, adds that amount of correction to the signal value of the input pixel similarly to step S308, thereby brightening the pixel signal Dui.

As explained above, by virtue of the second embodiment, it becomes possible to execute faster show-through correction compared to the first embodiment.

Third Embodiment

In the third embodiment, explanation will be given for an example in which show-through correction information that becomes the index for correcting show-through is generated in advance and is stored in a storage unit. In the third embodiment the internal configuration of the scanner image processing unit 2400 (in particular, the show-through correction processing unit) and the processing flow pertaining to the show-through correction are different to the second embodiment. However, the outer appearance of the copying machine, the configuration of the scanner unit 140, and the configuration of the controller 200 are similar to those of the first and second embodiments. Below, detailed explanation will be given for the third embodiment with a focus on portions that are different to the second embodiment.

<Show-Through Correction Processing Unit>

Figure 15:
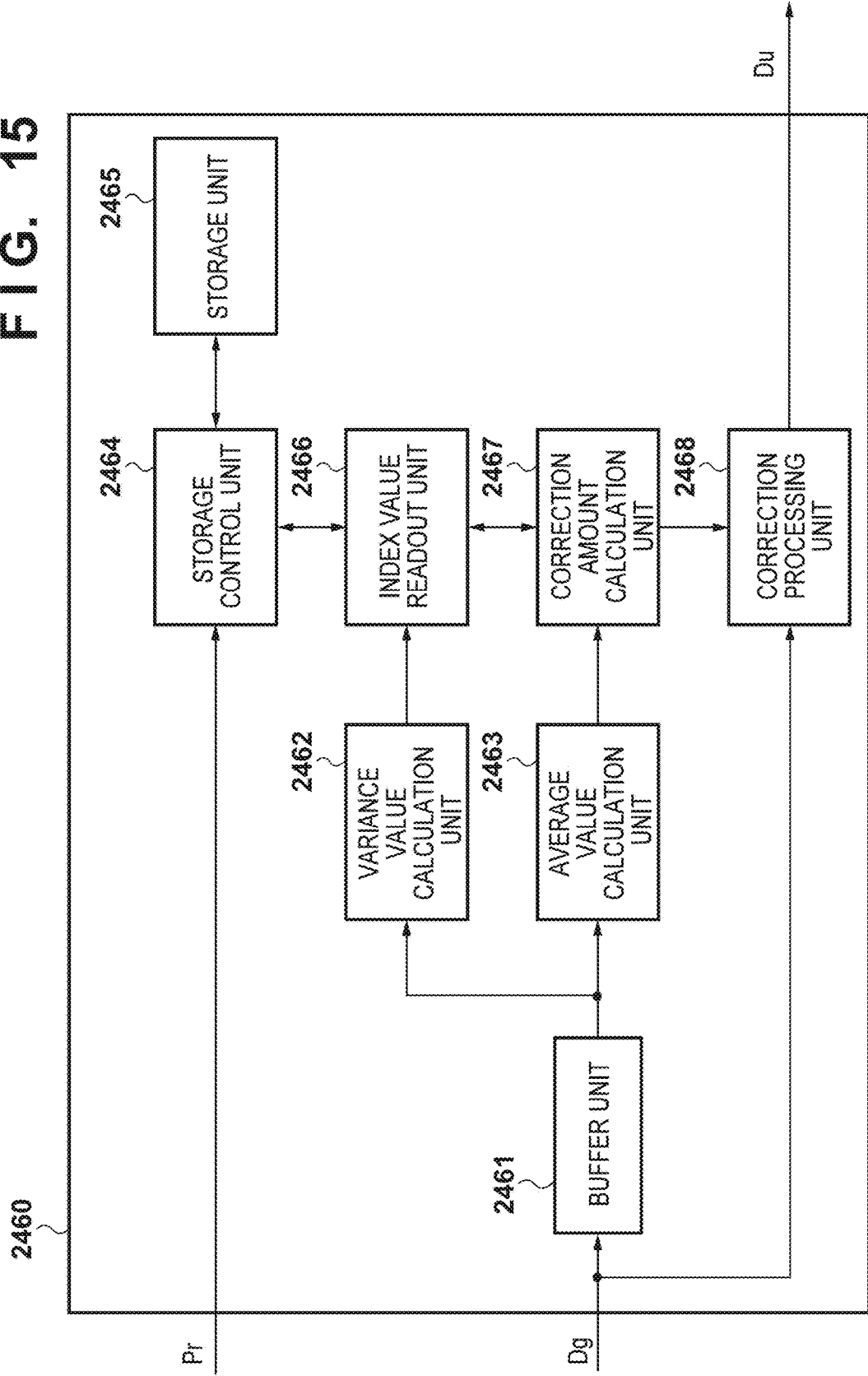
FIG. 15 is a block diagram for showing a configuration of the show-through correction processing unit in a third embodiment.

FIG. 15 is a block diagram for showing a configuration of a show-through correction processing unit 2460 in the third embodiment. The arrangement of the blocks within the scanner image processing unit 2400 is similar to the show-through correction processing unit 2450 in the second embodiment. A buffer unit 2461, a variance value calculation unit 2462, and an average value calculation unit 2463 have similar configurations to those of the buffer unit 2431, the variance value calculation unit 2432, and the average value calculation unit 2433 in the first embodiment.

In a storage control unit 2464, writing data to the storage unit 2465 and reading out is controlled. In the storage unit 2465, similarly to the first embodiment, an average value for each variance value is stored in an LUT format. For the storage control unit 2464, a configuration is taken such that input data Pr for which the address of the LUT in the storage unit 2465 and the data are a set is received. The input data Pr is something for which the relationship between the variance value and the average value is a set in a case where there is no show-through. The storage control unit 2464 writes the inputted data that makes the set with the address at an address of the storage unit 2465 similar to the address of the input data Pr when the input data Pr (the address and the data) is received. The input data Pr is something that is generated in advance by analyzing images for which there is no show-through.

Also, configuration may be taken in which an image, for which it is confirmed in advance that there is no show-through, is inputted into the show-through correction processing unit 2460 as the pixel signal Dg, and the variance values and the average values are calculated and stored in the storage unit 2465 in advance rather than analyzing in advance. In such a case, for example, a predetermined chart for which there is no show-through is input, or analyzed, in a copying machine manufacturing process. Then, the show-through correction information that is the index for correcting show-through is stored in the storage unit 2465 in advance.

Note, because there are cases in which the relationship between the variance value and the average value indicates differing characteristics for each individual scanner, it is advantageous that the show-through correction information be generated for each individual scanner. Also, because characteristics vary in accordance with the various settings of a scan (for example, resolution settings, or the like), configuration may be taken such that an LUT is held for each resolution.

In an index value readout unit 2466, a variance value that the variance value calculation unit 2462 outputs is referenced, and an obtainment request for the show-through correction information Inf (the average value) which is the index value for correction corresponding to the variance value is transmitted to the storage control unit 2464. The storage control unit 2464, when it receives the obtainment request, reads out the index value for correction stored in the LUT of the storage unit 2465. Then the read out average value is transmitted to the index value readout unit 2466 and used as the show-through correction information Inf.

In a correction amount calculating unit 2467, the amount of correction for correction of the pixel signal Dg is calculated. More specifically, the processing makes the difference between "the average value by the show-through correction information Inf received from the index value readout unit 2466" and "the average value in the current region of interest that the average value calculation unit 2463 calculates" to be the amount of correction. Here, in a case where the difference is a negative value, it means that the average value in the region of interest is bright, and so the amount of correction is 0. This is outputted to a correction processing unit 2468 as the amount of correction.

In the correction processing unit 2468, the show-through correction processing is executed for the inputted pixel signal Dg based on the amount of correction received from the correction amount calculating unit 2467. The show-through correction processing makes the pixel signal Dg brighter by adding the amount of correction to the luminance value of the pixel signal Dg, for example. If the inputted pixel signal is a pixel signal for which there is no show-through, the difference is small, and so the amount of correction is small. The corrected pixel signal value is written back into the RAM 2110 as Du.

<LUT Update Processing>

Figure 17:
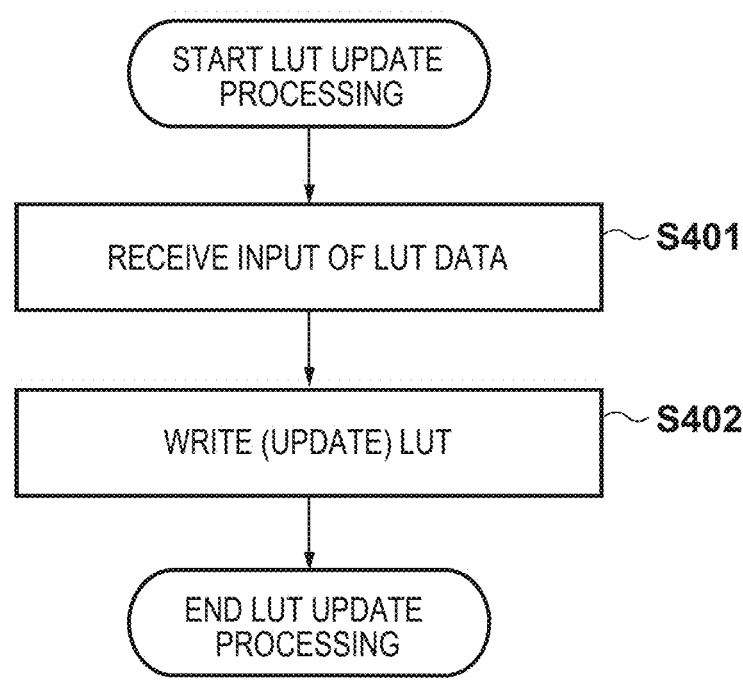
FIG. 17 is a flowchart for the LUT update processing in accordance with the third embodiment.

FIG. 17 is a flowchart for LUT update processing in the third embodiment. In the third embodiment, the LUT update processing is executed in advance prior to the user actually executing an original read. For example, by executing this LUT update processing in a factory manufacturing process, for example, the show-through correction information is stored in the storage unit 2465 in advance. The LUT update processing is realized by the CPU 2100 executing a program stored in the HDD 2130, and controlling the scanner unit 140 and the scanner image processing unit 2400 (the show-through correction processing unit 2460 in particular).

In step S401, the show-through correction processing unit 2460 receives input of LUT data stored in the storage unit 2465. The received data is input data Pr explained in FIG. 15, and the relationship of the variance value and the average value is a set for a case where there is no show-through. The input data Pr is something that is generated in advance by analyzing images for which there is no show-through. Note that configuration may be taken such that an image for which there is no show-through is inputted into the show-through correction processing unit 2460 as the pixel signal Dg, and the input data Pr is obtained by calculating the variance value and the average value. In such a case, a gradation original for which it is confirmed that there is no show-through is input, the variance value and the average value (a reference average value) are calculated, and these are written to the storage unit 2465.

In step S402, the show-through correction processing unit 2460 executes the writing (updating) of data to the LUT of the storage unit 2465. The written address and data are the set of data received in step S401.

As explained above, by virtue of the third embodiment, the LUT update processing is executed prior to a user actually executing an original read by the copying machine (for example, in a manufacturing process of the copying machine). Information indicating a relationship between the variance and the average value where there is no show-through (a reference table) is stored as the LUT of the storage unit 2436. By this configuration, even in the case where the show-through correction information cannot be extracted appropriately from the read-in image data, the show-through correction processing is suitably executable.

Fourth Embodiment

In the fourth embodiment, explanation will be given for an example in which a read resolution necessary for correcting show-through is selected appropriately, and show-through correction is executed. In the fourth embodiment, processing for selecting the read resolution is added to the second embodiment. However, the outer appearance of the copying machine, the configuration of the scanner unit 140, and the configuration of the controller 200 are similar to those of the first, second and third embodiments. Below, detailed explanation will be given for the second embodiment within a focus on portions that are different to the fourth embodiment.

<Image Readout Processing>

Figure 18:
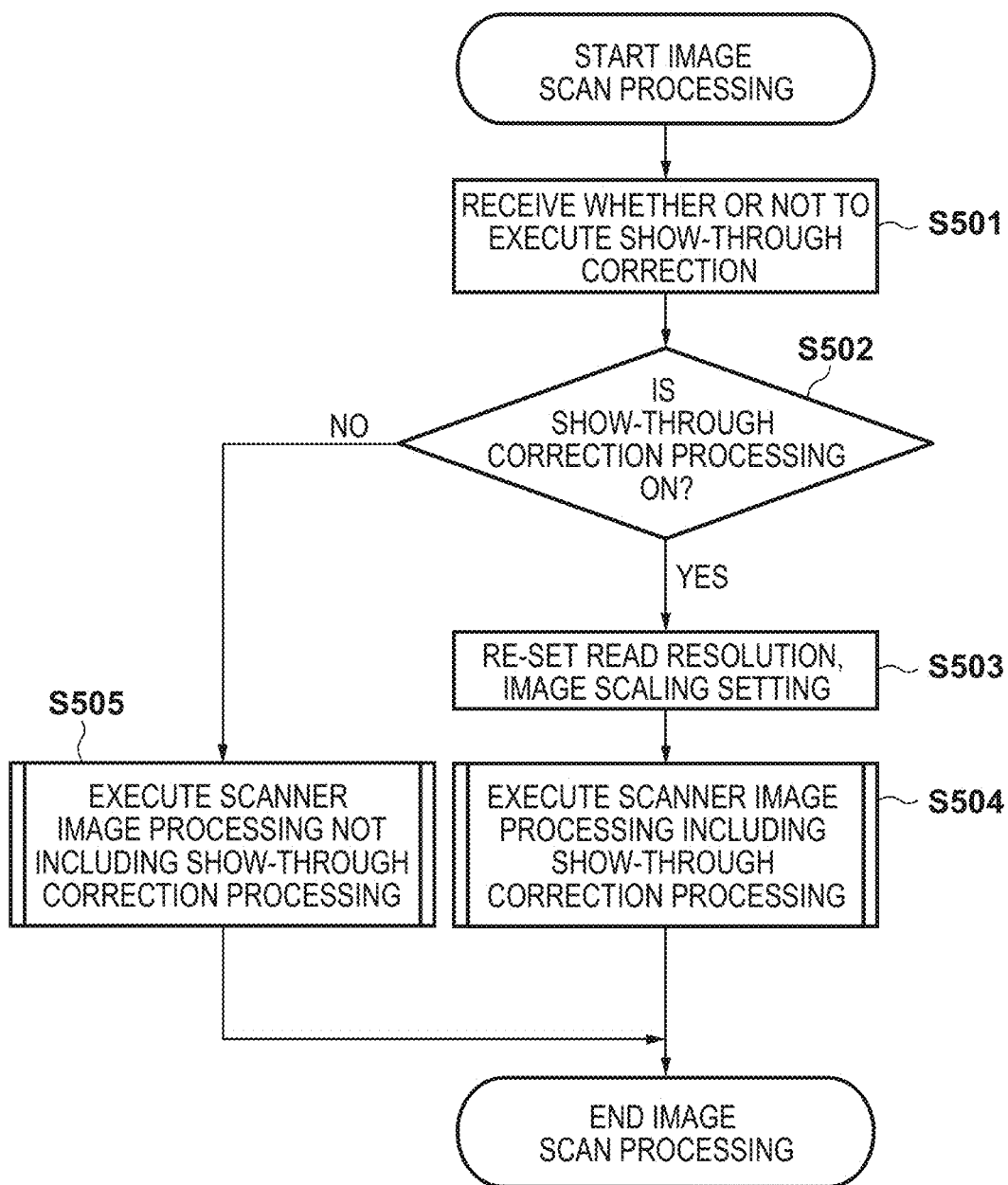
FIG. 18 is a flowchart for image readout processing in a fourth embodiment.

FIG. 18 is a flowchart for image readout processing in a fourth embodiment. The image readout processing is realized by the CPU 2100 controlling the scanner unit 140 and the scanner image processing unit 2400 by executing a program stored in the HDD 2130.

In step S501, the copying machine receives whether or not to execute a show-through correction from a user. For example, a form may be taken in which a setting for whether or not to execute the show-through correction is determined having received an instruction from the operation unit 160 made by an operation of the user. FIG. 19 is a view for showing an example of a display for receiving a selection of whether or not to execute the show-through correction processing. This display is, for example, displayed on a liquid crystal operation panel on the operation unit 160, and the execution of the show-through correction is selected by an operation of a user.

In step S502, the CPU 2100 determines whether or not the show-through correction is ON in step S501. In a case where the show-through correction processing is ON (execute), the processing proceeds to step S503. In a case where the show-through correction processing is OFF (execution prohibition), the processing proceeds to step S505.

In step S503, the CPU 2100 executes resetting of the read resolution in the image readout processing. Normally the read resolution is something that is determined in accordance with a resolution setting determined by the user on the operation unit 160. In particular, this is set by processing for digitizing the read original, and, for example, if it is desired that a scan image of a high quality be obtained, the resolution is set to be high, and the read resolution becomes higher in accordance with that. Also, if it is desired that scanning be performed at high speed, the resolution is set to be lower, and the read resolution becomes lower in accordance with that.

However, in a case where the show-through correction is executed, it is advantageous that the read resolution be higher. In particular, the image data input into the show-through correction processing unit 2450 should be of a resolution for which the halftone dots in the image can be resolved sufficiently. So, in step S503, the read resolution is reset to a resolution at which the show-through correction processing can be executed at a high-quality. Also, in order to make a final output resolution conform to the resolution setting determined by the user, image scaling setting is performed. The image scaling processing may be processed by a module in the scanner image processing unit 2400 (not shown), and configuration may be taken such that this is processed using a software program by the CPU 2100.

In step S504, the CPU 2100 executes scanner image processing including show-through correction processing by controlling the scanner unit 140 and the scanner image processing unit 2400. Here, an image is input at a resolution at which the halftone dots in the image can be resolved sufficiently by the show-through correction processing unit 2450.

In step S505, the CPU 2100 executes scanner image processing not including the show-through correction processing by controlling the scanner unit 140 and the scanner image processing unit 2400. Here, an image is input at a read resolution determined in accordance with a resolution setting determined by the user on the operation unit 160 in the scanner image processing unit 2400. For example, the read resolution in step S505 is set to be lower than the read resolution in step S504.

Note, there is a concern that show-through correction processing for a high resolution will have reduced reading speed (productivity). For this reason, configuration may be taken such that this is something that is only executed in a reading operation using the original platen glass 1400 and not executed in a flow reading operation using the original feeder 141.

As explained above, by virtue of the fourth embodiment, the show-through correction processing can be executed at an appropriate read resolution, and it becomes possible to execute the show-through correction at a higher quality compared to the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-046761, filed Mar. 10, 2014, which is hereby incorporated by reference herein in its entirety.

What is claimed is:

1. An image processing apparatus, comprising:
a first obtaining unit configured to obtain a feature amount indicating variance of signal values of pixels included in a region of image data, wherein the region is of a predetermined size and includes a pixel of interest;
a second obtaining unit configured to obtain a feature amount indicating a brightness in the region;
a determination unit configured to determine an amount of correction of a value of the pixel of interest using the feature amount indicating the brightness and an index value corresponding to the feature amount indicating variance in reference to index values corresponding to each of a plurality of mutually differing feature amounts indicating variance; and
a correction unit configured to correct the value of the pixel of interest using the amount of correction determined by the determination unit,
wherein the first obtaining unit, the second obtaining unit, the determination unit, and the correction unit are implemented by one or more processors or circuitry, or a combination thereof.

2. The image processing apparatus according to claim 1, wherein the feature amount indicating the brightness is an average value of signals each indicating a brightness of a pixel included in the region.

3. The image processing apparatus according to claim 2, further comprising a generation unit configured to, based on each feature amount indicating variance and average value for a plurality of regions of the image data, generate a reference table that specifies the index value respectively corresponding to each of the plurality of mutually differing feature amounts indicating variance, and
in a case where a plurality of differing average values are obtained for the same feature amount indicating variance, a maximum average value out of the plurality of differing average values is set in the reference table as a reference average value corresponding to the same feature amount indicating variance,
wherein the generation unit is implemented by one or more processors or circuitry, or a combination thereof.

4. The image processing apparatus according to claim 3, further comprising a second determination unit configured to determine whether or not an image edge is included in the region, and
in a case where it is determined that an image edge is included in the region, the feature amount indicating variance for the region and the average value are not used for the generation of the reference table,
wherein the second determination unit is implemented by one or more processors or circuitry, or a combination thereof.

5. The image processing apparatus according to claim 3, wherein the reference table is a look-up table (LUT) that associates a plurality of feature amounts indicating variance, each corresponding to a differing image density, and reference average values, each corresponding to each of the plurality of feature amounts indicating variance.

6. The image processing apparatus according to claim 3, wherein
the reference table is stored for each color component,
the first obtaining unit obtains a feature amount indicating variance of signal values of a plurality of pixels included in the region for each of the color components, and
the second obtaining unit obtains an average value of the signal values of the plurality of pixels included in the region for each of the color components.

7. The image processing apparatus according to claim 1, wherein the feature amount indicating variance is a variance value of signal values of the pixels included in the region or a standard deviation value of signal values of the pixels included in the region.

8. The image processing apparatus according to claim 1, wherein the image data is data obtained by reading an original onto which a halftone processed image is printed.

9. The image processing apparatus according to claim 8, wherein the resolution at which the original is read is higher than the resolution of the halftone processed image on the original.

10. The image processing apparatus according to claim 1, further comprising: an input panel configured to specify via operator input whether or not to execute the correction; and
a scanner which reads an original, wherein the scanner reads the original setting a read resolution in a case where an execution prohibition of the correction is specified by the input panel to be lower than a read resolution in a case where an execution of the correction is specified by the input panel.

11. The image processing apparatus according to claim 10, wherein the input panel specifies the execution prohibition of the correction in a case where the reading unit performs a flow reading using a document feeder.

12. The image processing apparatus according to claim 1, wherein the correction unit executes the correction for the region in a case where an image density indicates that the feature amount indicating variance of the region is less than a predetermined image density.

13. The image processing apparatus according to claim 1, wherein the correction unit executes the correction by multiplying a gain corresponding to a difference between the feature amount indicating the brightness and the index value corresponding to the feature amount indicating variance with the amount of correction.

14. The image processing apparatus according to claim 1, wherein the correction unit executes the correction by multiplying a gain corresponding to an image density that the region indicates with the amount of correction.

15. The image processing apparatus according to claim 1, wherein the determination unit determines the amount of correction using a value of difference between the feature amount indicating the brightness and the index value.

16. The image processing apparatus according to claim 1, wherein in a case where the feature amount indicating a brightness shows a larger brightness than a predetermined brightness, the correction is performed on the value of the pixel of interest.

17. The image processing apparatus according to claim 1, wherein the determination unit determines a value of a difference between the index value corresponding to the feature amount indicating variance and the feature amount indicating the brightness as the amount of correction of the value of the pixel of interest.

18. An image processing method for an image processing apparatus, the method comprising the steps of:
 obtaining (a) a feature amount indicating variance of signal values of pixels included in a region of image data, wherein the region is of a predetermined size and includes a pixel of interest, and (b) a feature amount indicating a brightness in the region;
 determining an amount of correction of a value of the pixel of interest using the feature amount indicating the brightness and an index value corresponding to the feature amount indicating variance in reference to index values corresponding to each of a plurality of mutually differing feature amounts indicating variance; and
 correcting the value of the pixel of interest using the amount of correction determined by the determining step.

19. A non-transitory computer-readable recording medium storing a program that causes a computer having one or more processors and a memory for storing instructions to perform a method, the method comprising the steps of:
 obtaining (a) feature amount indicating variance of signal values of pixels included in a region of image data, wherein the region is of a predetermined size and includes a pixel of interest, and (b) a feature amount indicating a brightness in the region;
 determining an amount of correction of a value of the pixel of interest using the feature amount indicating the brightness and an index value corresponding to the feature amount indicating variance in reference to index values corresponding to each of a plurality of mutually differing feature amounts indicating variance; and
 correcting the value of the pixel of interest using the amount of correction determined by the determining step.

20. An image processing apparatus, comprising:
 a first obtaining unit configured to obtain a variance value of a density or a luminance of pixels included in a region of image data, wherein the region is of a predetermined size and includes a pixel of interest;
 a second obtaining unit configured to obtain an average value of luminance in the region;
 a determination unit configured to determine an amount of correction of a value of the pixel of interest using the obtained average value of luminance and an average value of luminance corresponding to the variance value in reference to index values corresponding to each of a plurality of mutually differing variance values; and
 a correction unit configured to correct the value of the pixel of interest using the amount of correction determined by the determination unit,
 wherein the first obtaining unit, the second obtaining unit, the determination unit, and the correction unit are implemented by one or more processors or circuitry, or a combination thereof.

21. The image processing apparatus according to claim 20, wherein the determination unit determines a value of a difference between the average value of luminance corresponding to the variance value and the average value of luminance as the amount of correction of the value of the pixel of interest.

22. An image processing method for an image processing apparatus, the method comprising the steps of:
 obtaining (a) a variance value of a density or a luminance of pixels included in a region of image data, wherein the region is of a predetermined size and includes a pixel of interest, and (b) an average value of luminance in the region;
 determining an amount of correction of a value of the pixel of interest using the obtained average value of luminance and an average value of luminance corresponding to the variance value in reference to index values corresponding to each of a plurality of mutually differing variance values; and
 correcting the value of the pixel of interest using the amount of correction determined by the determining step.

23. A non-transitory computer-readable recording medium storing a program that causes a computer having one or more processors and a memory for storing instructions to perform a method, the method comprising the steps of:
 obtaining (a) a variance value of a density or a luminance of pixels included in a region of image data, wherein the region is of a predetermined size and includes a pixel of interest, and (b) an average value of luminance in the region;
 determining an amount of correction of a value of the pixel of interest using the obtained average value of luminance and an average value of luminance corresponding to the variance value in reference to index values corresponding to each of a plurality of mutually differing variance values;
 correcting the value of the pixel of interest using the amount of correction determined by the determining step.

* * * * *